United States Patent
Gonzalez et al.

(10) Patent No.: US 11,792,612 B2
(45) Date of Patent: Oct. 17, 2023

(54) METHOD OF UPDATING A BACKGROUND DATA TRANSFER POLICY NEGOTIATED BETWEEN AN APPLICATION FUNCTION AND A CORE NETWORK, A POLICY CONTROL FUNCTION, AND AN APPLICATION FUNCTION

(71) Applicant: Telefonaktiebolaget LM Ericsson (publ), Stockholm (SE)

(72) Inventors: Antonio Iniesta Gonzalez, Madrid (ES); Wenliang Xu, Shanghai (CN); Susana Fernandez Alonso, Madrid (ES); Miguel Angel Garcia Martin, Pozuelo de Alarcon (ES); Miguel Angel Puente Pestaña, Madrid (ES); Maria Belen Pancorbo Marcos, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 17/609,962

(22) PCT Filed: Apr. 23, 2020

(86) PCT No.: PCT/EP2020/061331
§ 371 (c)(1),
(2) Date: Nov. 9, 2021

(87) PCT Pub. No.: WO2020/254014
PCT Pub. Date: Dec. 24, 2020

(65) Prior Publication Data
US 2022/0312158 A1    Sep. 29, 2022

Related U.S. Application Data

(60) Provisional application No. 62/862,187, filed on Jun. 17, 2019.

(51) Int. Cl.
*H04M 15/00* (2006.01)
*H04W 4/24* (2018.01)
(Continued)

(52) U.S. Cl.
CPC ............. *H04W 4/24* (2013.01); *H04W 48/18* (2013.01); *H04W 80/12* (2013.01)

(58) Field of Classification Search
CPC ....... H04W 4/24; H04W 48/18; H04W 80/12; H04W 28/0284; H04L 41/0895;
(Continued)

(56) References Cited

U.S. PATENT DOCUMENTS 10,009,850 B2    6/2018  McClure et al.
2011/0251952 A1  10/2011 Kelly et al.
(Continued)

FOREIGN PATENT DOCUMENTS

RU    2581784 C2    4/2016
WO    2018168132 A1  9/2018

OTHER PUBLICATIONS

"Removal of Editor's note and update the specification for BDT warning notification in TS 23.502", 3GPP TSG-SA WG2 Meeting #133, S2-1906083, Reno, NV, USA, (revision of S2-1904923), May 13-17, 2019, pp. 1-7.
(Continued)

*Primary Examiner* — Huy C Ho
(74) *Attorney, Agent, or Firm* — Murphy, Bilak & Homiller, PLLC

(57) ABSTRACT

A method of updating a background data transfer, BDT, policy negotiated between an application function, AF, and a Core Network, CN, is disclose. The method is performed by a Policy Control Function, PCF, of the CN and comprises determining updated BDT policy information including updated conditions for the negotiated BDT policy and at
(Continued)

least one candidate BDT policy for the AP to select when the PCF determines that the negotiated BDT policy is affected by degraded network performance. The determined updated BDT policy information is then sent to the AF by the PCF using notification type interaction, thereby effectively updating the negotiated BDT policy.

17 Claims, 14 Drawing Sheets

(51) Int. Cl.
*H04W 48/18* (2009.01)
*H04W 80/12* (2009.01)

(58) Field of Classification Search
CPC ............. H04L 41/0897; H04L 41/0806; H04L 12/1407; H04L 67/06; H04L 67/60; H04L 41/0893; H04M 15/80; H04M 15/8022; H04M 15/8044; H04M 15/81; H04M 15/66
USPC ........................................................ 455/406
See application file for complete search history.

(56) References Cited

U.S. PATENT DOCUMENTS

2018/0192471 A1     7/2018   Li et al.
2020/0022027 A1*    1/2020   Iwai ..................... H04L 12/14

OTHER PUBLICATIONS

"3GPP TS 23.288 V16.0.0", 3rd Generation Partnership Project; Technical Specification Group Services and System Aspects; Architecture enhancements for 5G System (5GS) to support network data analytics services (Release 16), Jun. 2019, pp. 1-52.
"3GPP TS 23.288 V16.1.0", 3rd Generation Partnership Project; Technical Specification Group Services and System Aspects; Architecture enhancements for 5G System (5GS) to support network data analytics services (Release 16), Sep. 2019, pp. 1-52.
"3GPP TS 23.501 V16.0.2", 3rd Generation Partnership Project; Technical Specification Group Services and System Aspects; System Architecture for the 5G System; Stage 2 (Release 16), Apr. 2019, pp. 1-317.
"3GPP TS 23.503 V16.1.0", 3rd Generation Partnership Project; Technical Specification Group Services and System Aspects; Policy and Charging Control Framework for the 5G System; Stage 2 (Release 16), Jun. 2019, pp. 1-99.
"3GPP TS 23.503 V16.3.0", 3rd Generation Partnership Project; Technical Specification Group Services and System Aspects; Policy and charging control framework for the 5G System (5GS); Stage 2 (Release 16), Dec. 2019, pp. 1-112.
"BDT renegotiation upon expected network performance change", 3GPP TSG Change Request; 23.502 v16.1.0, Jun. 2019, pp. 1-6.
"BDT renegotiation upon expected network performance change", 3GPP TSG SA2 Meeting #134; S2-1906988; Sapporo, Japan, Jun. 24-28, 2019, pp. 1-6.
"BDT renegotiation upon expected network performance change", 3GPP TSG SA2 Meeting #134; S2-1906989; Sapporo, Japan, Jun. 24-28, 2019, pp. 1-6.
"BDT renegotiation upon expected network performance change", 3GPP TSG SA2 Meeting #136; S2-1912623; Reno NV, USA, Nov. 18-22, 2019, pp. 1-4.
"BDT renegotiation upon expected network performance change", 3GPP TSG SA2 Meeting #136; S2-1912646; Reno NV USA, Nov. 18-22, 2019, pp. 1-5.
"Solution for Key Issue 7: NWDAF assisting Future Background Data Transfer", SA WG2 Meeting #128bis; S2-189050; Sophia Antipolis, France (e-mail revision 1 of S2-188508), Aug. 20-24, 2018, pp. 1-4.
"Support of Npcf_BDTPolicyControl_Notify service operation", 3GPP TSG-CT WG3 Meeting #103; C3-192187; Reno, US; (revision C3-191232), May 13-17, 2019, pp. 1-16.
"3GPP TS 23.502, v16.3.0", Technical Specification Group Services and System Aspects; Procedures for the 5G System; Stage 2, Dec. 2019, pp. 1-558.
"3GPP TS 38.401 V15.5.0", 3rd Generation Partnership Project; Technical Specification Group Radio Access Network; NG-RAN; Architecture description (Release 15), Mar. 2019, pp. 1-39.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.502 V16.1.1", 3rd Generation Partnership Project; Technical Specification Group Services and System Aspects; Procedures for the 5G System; Stage 2 (Release 16), Jun. 2019, pp. 1-495.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.
"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.
"3GPP TS 24.301 V15.7.0", 3rd Generation Partnership Project; Technical Specification Group Core Network and Terminals; Non-Access-Stratum (NAS) protocol for Evolved Packet System (EPS); Stage 3 (Release 15), Jun. 2019, pp. 1-539.
"3GPP TS 29.554 V15.3.0", 3rd Generation Partnership Project; Technical Specification Group Core Network and Terminals; 5G System; Background Data Transfer Policy Control Service; Stage 3 (Release 15), Mar. 2019, pp. 1-27.

* cited by examiner

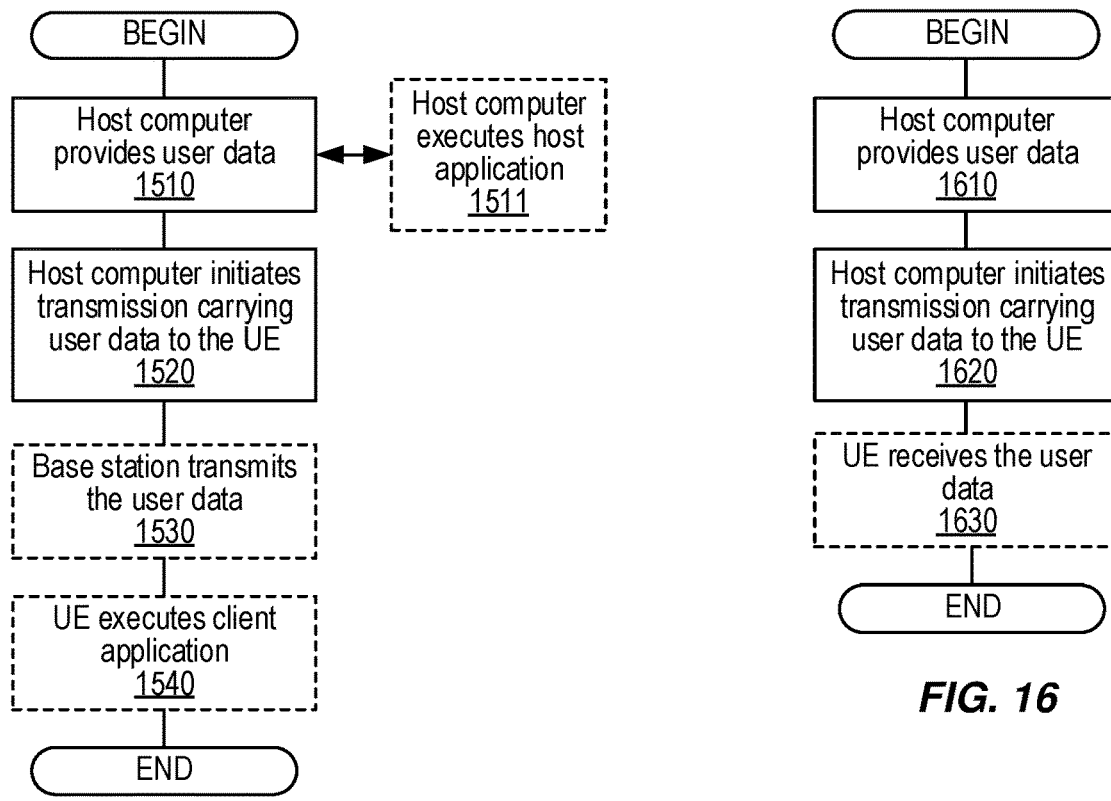
FIG. 15
FIG. 16
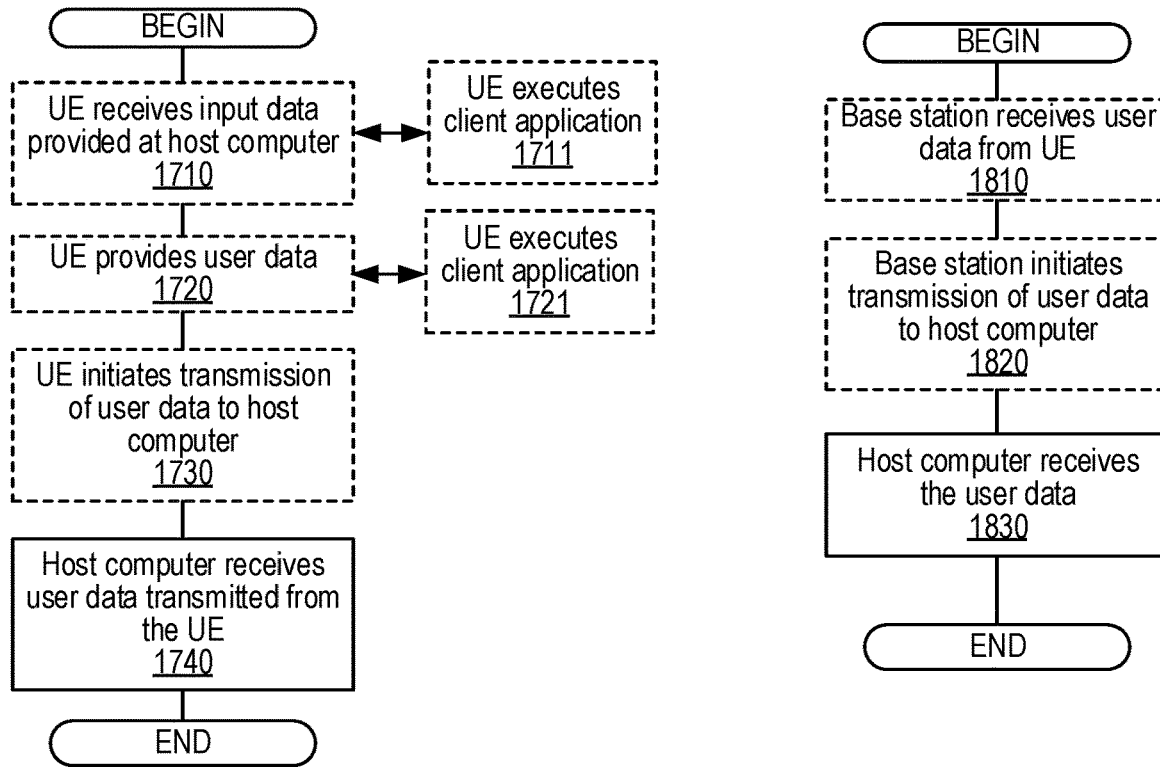
FIG. 17
FIG. 18

METHOD OF UPDATING A BACKGROUND DATA TRANSFER POLICY NEGOTIATED BETWEEN AN APPLICATION FUNCTION AND A CORE NETWORK, A POLICY CONTROL FUNCTION, AND AN APPLICATION FUNCTION

TECHNICAL FIELD

The present disclosure generally relates to the field of telecommunication networks, and, more specifically, to a method of updating a background data transfer policy negotiated between an application function, AF, and a core network, CN, a Policy Control Function, PCF, and an AF.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution, LTE, is an umbrella term for so-called fourth-generation, 4G, radio access technologies developed within the Third-Generation Partnership Project, 3GPP, and initially standardized in Releases 8 and 9, also known as Evolved UTRAN, E-UTRAN. LTE is targeted at various licensed frequency bands and is accompanied by improvements to non-radio aspects commonly referred to as System Architecture Evolution, SAE, which includes Evolved Packet Core, EPC, network. LTE continues to evolve through subsequent releases. One of the features of Release 11 is an enhanced Physical Downlink Control Channel, ePDCCH, which has the goals of increasing capacity and improving spatial reuse of control channel resources, improving inter-cell interference coordination, ICIC, and supporting antenna beamforming and/or transmit diversity for control channel.

An overall exemplary architecture of a network comprising LTE and SAE is shown in FIG. 1. E-UTRAN 100 comprises one or more evolved Node B's, eNBs, such as eNBs 105, 110, and 115, and one or more user equipment, UE, such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity, MME, and the Serving Gateway, SGW, shown collectively as MME/S-GWs 134 and 138 in FIG. 1. Generally speaking, the MME/S-GW handles both the overall control of the UE and data flow between the UE and the rest of the EPC. More specifically, the MME processes the signalling (e.g., control plane) protocols between the UE and the EPC, which are known as the Non-Access Stratum, NAS, protocols. The S-GW handles all Internet Protocol, IP, data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server, HSS 131, which manages user- and subscriber-related information. HSS 131 can also provide support functions in mobility management, call and session setup, user authentication and access authorization. The functions of HSS 131 can be related to the functions of legacy Home Location Register, HLR, and Authentication Centre, AuC, functions or operations.

In some embodiments, HSS 131 can communicate with a user data repository, UDR,—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In 3GPP, a study item on a new radio interface for a fifth-generation, 5G, cellular (e.g., wireless) network has been completed, and 3GPP is now standardizing this new radio interface, often abbreviated by NR, New Radio. FIG. 2 illustrates a high-level view of the 5G network architecture, consisting of a Next Generation RAN, NG-RAN 299, and a 5G Core, 5GC 298. NG-RAN 299 can include a set of gNodeB's, gNBs, connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect the the NR interface to UEs, each of the gNBs can support frequency division duplexing, FDD, time division duplexing, TDD, or a combination thereof.

NG-RAN 299 is layered into a Radio Network Layer, RNL, and a Transport Network Layer, TNL. The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for Control Plane, CP, and User Plane, UP, data on TNL of NG-RAN interfaces is supported, NDS/IP (3GPP TS 33.401) shall be applied.

The NG RAN logical nodes shown in FIG. 2 (and described in 3GPP TS 38.401 and 3GPP TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 3. The gNB-CU and connected gNB-DUs are only visible to other gNBs and the 5GC as a gNB. In other words, the F1 interface is not visible beyond gNB-CU.

FIG. 3 shows a high-level view of an exemplary 5G network architecture, including a NG-RAN 399 and a 5GC 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the Access and Mobility Management Function, AMF 330 (e.g., AMFs 330a,b) via respective NG-C interfaces and to the User Plane Function UPF, 340 (e.g., UPFs 340a,b) via respective NG-U interfaces. Moreover, the AMFs 340a,b can communicate with one or more policy control functions, PCFs, (e.g., PCFs 350a,b) and network exposure functions, NEFs, (e.g., NEFs 360a,b). The AMFs, UPFs, PCFs, and NEFs are described further below.

Each of the gNBs 310 can support the NR radio interface, including FDD, TDD, or a combination thereof. In contrast, each of ng-eNBs 320 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., a public land mobile network, PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the CN by which it is served. Another change in 5G networks (e.g., in 5GC) is that traditional peer-to-peer interfaces and protocols (e.g., those found in LTE/EPC networks) are modified by a so-called Service Based Architecture, SBA, in which Network Functions, NFs, provide one or more services to one or more service consumers. This can be done, for example, by Hyper Text Transfer Protocol/Representational State Transfer, HTTP/REST, application programming interfaces, APIs. In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions, NRF, allow every network function to discover the services offered by other network functions, and Data Storage Functions, DSF, allow every network function to store its context.

As discussed above, services can be deployed as part of a NF in the 5G SBA. This SBA model, which further adopts principles like modularity, reusability and self-containment of NFs, can enable deployments to take advantage of the latest virtualization and software technologies. FIG. 4 shows an exemplary non-roaming 5G reference architecture with service-based interfaces and various 3GPP-defined NFs within the CP. These include:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface;
Network Data Analytics Function (NWDAF) (not shown); and
Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository, UDR. In addition to the UDM, the UDR supports storage and retrieval of policy data by the PCF, as well as storage and retrieval of application data by NEF.

3GPP Rel-15 also specifies a Network Data Analytics Function, NWDAF, including services (referred to as "Nnwdaf") that facilitate basic policy and network slicing control based on analytics information, which can include statistical information of the past events and/or predictive information. 3GPP Rel-16 enhances the Re-15 analytics architecture and services based on a new 3GPP TS 23.288 (v16.0.0). Different NWDAF instances may be present in the 5GC, with possible specializations per categories of analytics. The capabilities of a particular NWDAF instance are described in the NWDAF profile stored in the NRF. In addition, various other NFs provide specific services in support of the NWDAF.

The provisioning of services by an AF requires management of network resources, which are typically requested by a service while the service is running. Nevertheless, the provisioning of some services can be optimized by advance management and/or scheduling of network resources. One such service is "background data transfer" (BDT, described in 3GPP TS 23.503 v16.1.0 clause 6.1.2.4), which is typically associated with transfer of very large (or "huge") data volume with low traffic priority (e.g., software updates) that is not time sensitive. For example, such transmissions can be scheduled during time windows when the network is less loaded (e.g., during the night). Such BDT services that are scheduled in advance, as discussed above, are also referred to as "future data transfer."

3GPP TS 23.503 specifies features for negotiation of BDT between an application service provider, ASP, and a mobile network operator, MNO, and/or a PLMN. When the ASP initiates negotiation of BDT, it may also provide an indication that a BDT warning notification should be sent to the AF. A BDT warning notification indicates to the ASP that the BDT policy needs to be re-negotiated. Even so, there are various problems and/or limitations with the existing mechanisms for BDT renegotiation. For example, the MNO has limited flexibility to improve the network conditions via renegotiation of more restrictive rate limits and/or different charging policies.

3GPP draft "Support of Npcf_BDTPolicyControl_Notify service operation", by Huawei et al., C3-192187, discloses that when the PCF knows that the network performance in the area of interest goes below the operator's criteria, the PCF retrieves all the background transfer policies from the UDR, and if the PCF determines that the background data traffic is impacted, it sends an HTTP POST request with a warning notification to the NEF, which notification may contain the time window when the network performance will go below the operator's criteria.

SUMMARY

Accordingly, exemplary embodiments of the present disclosure address these and other difficulties in policy renegotiations between a MNO (e.g., a core network) and an ASP (e.g., an AF associated with the ASP).

In a first aspect of the present disclosure, there is presented a method of updating, in a core network, CN, of a telecommunication network, a background data transfer, BDT, policy negotiated between an application function, AF, and the CN, the method performed by a Policy Control Function, PCF, of the CN and comprising the steps of:
  determining, in response to receiving a notification of degraded network performance of a network area, that the negotiated BDT policy is affected by the degraded network performance and an Application Service Provider, ASP, associated with the negotiated BDT policy requested a warning notification;
  determining, at least based on operator policies, updated BDT policy information for the negotiated BDT policy, wherein the updated BDT policy information comprises at least one of the following:
    at least one candidate BDT policy, and
    updated conditions for the negotiated BDT policy, and
  sending the updated BDT policy information to the AF.

The present disclosure is based on the insight that an alternative way of changing a negotiated BDT policy between the AF and the PCF in the CN may be realised by using notify type interaction between involved NFs, that is, the AF and the PCF. The "Notify" type interaction, comparing to the request/response type interaction, allows the negotiated BDT policy affected by degraded network performance to be updated or changed in a way more efficient in terms of both consumed time and network resources such as number of signalling exchanged between the AF and the PCF.

Exemplary embodiments of the present disclosure include methods and/or procedures for negotiation of policies for BDT between an AF and a CN. These exemplary methods and/or procedures can be performed by one or more nodes or functions in the CN, such as a policy control function, PCF, in a 5G core network, 5GC.

As a preliminary step, the exemplary methods and/or procedures can include negotiating one or more first BDT policies with the AF. The exemplary methods and/or procedures can also include determining that at least one of the first BDT policies will be affected by network performance (e.g., load or congestion). The exemplary methods and/or procedures can also include determining updated BDT policy information for each affected first BDT policy. The updated BDT policy information for an affected first BDT policy can include one or more candidate second BDT policies, and/or one or more updated conditions for the affected first BDT policy.

In some embodiments, the exemplary methods and/or procedures can also include sending, to the AF, the updated BDT policy information for each affected first BDT policy.

The method therefore allows an MNO, which becomes aware of the changed or degraded network performance, to rely on at least operator policies that is available, to decide whether new or updated conditions, such as a different charging rate and a different maximum aggregated bitrate, apply to the negotiated BDT policy, that is, the first BDT policy. The MNO can then inform the ASP of the new or updated conditions. The ASP has provided, when initiating the negotiation of BDT, an indication that BDT warning notification should be sent to the AF. The BDT warning notification indicates to the ASP that the BDT policy need to be re-negotiated, or updated.

Additionally, the MNO, by way of the PCF, can generated a new set of candidate BDT policies according to the new network performance information and other information data. The PCF then provides the new set of candidate BDT policies to the ASP.

In contrast with the conventional method of renegotiating a new BDT policy to replace the negotiated BDT policy which is affected by the degraded network performance, by using the request/response type interaction, the above method in accordance with the present disclosure enables the NMO to control the conditions for applying BDT when the analytics data, such as predictions, on network performance indicate a potential degradation or improvements of load in the network area and at a time when the negotiated BDT is agreed to take place.

Further, in contrast with the conventional method which allows only the ASP to initiate the BDT negotiation, the method of the present disclosure enables the MNO to control when the BDT negotiation should start, and therefore realising a better control of the BDT traffic in its network.

In an embodiment of the present disclosure, the step of sending comprising sending the updated BDT policy information to the AF as a notification via a Network Exposure Function, NEF.

Specifically, the PCF invokes a Npcf_BDTPolicyControl_ Notify service to send the updated BDT policy information to the NEF, which in turns invokes a Nnef_BDTPolicyControl_Notify service to send the updated BDT policy information to the AP.

The sending of the updated BDT policy information is performed using the currently available services of the NFs, without the need of introducing new service operations.

In an embodiment of the present disclosure, the method further comprising the step of updating the negotiated BDT policy stored in a data repository based on the updated conditions for the negotiated BDT policy.

This operation is especially advantageous in that it allows the BDT policy to be updated, without going through a much time-consuming procedure of renegotiating another BDT policy between the AF and the PCF. The operation allows the background transfer to be adapted to the changed network conditions, which is more efficient than waiting till the completion of the renegotiation of another BDT policy.

In an embodiment of the present disclosure, the updated conditions comprise an updated BDT time window, and the method further comprises the steps of:

identifying one or more user equipment, UE, to which the negotiated BDT policy has been applied; and updating route-selection policy rules for the identified UE based on the updated BDT time window.

The UEs can in this way get their route-selection policy rules updated easily, again not having to wait till another new BDT policy to be applied.

In another embodiment of the present disclosure, the method further comprising the step of:

receiving, from the AF, a further BDT policy selected by the AF from the at least one candidate BDT policy, and updating the negotiated BDT policy to the selected further BDT policy.

In such embodiments, the exemplary methods and/or procedures can also include receiving, from the AF, one or more second BDT policies, wherein each second BDT policy is one of the candidate second BDT policies associated with an affected first BDT policy. For example, the AF provides a second BDT policy that it has selected from among the candidate second BDT policies provided, by the CN, for the affected first BDT policy.

This steps can be performed if the AF choose to select a different BDT policy, which will be followed by procedures of updating the selected BDT policy with the PCF.

In an embodiment of the present disclosure, the updated conditions comprise at least one of the following: an updated charging rate and an updated maximum aggregated bitrate.

These conditions are most likely to be influenced by the degraded network performance. Therefore, updating the charging rate and maximum aggregated bitrate to more appropriate values can ensure the background data transfer is carried on smoothly.

In a second aspect of the present disclosure, there is presented a method of updating a background data transfer, BDT, policy by an application function, AF, with a Policy Control Function, PCF, in a Core Network, CN, of a telecommunication network, the method comprising the steps of receiving, updated BDT policy information, from the PCF, the updated BDT policy information being determined by the PCF in response to the PCF determining that a current BDT policy between the AF and the CN is affected by degraded network performance and an Application Service Provider, ASP, associated with the current policy requested a warning notification, wherein the updated BDT policy information comprises at least one of the following:

at least one candidate BDT policy, and updated conditions for the negotiated BDT policy.

Exemplary embodiments of the present disclosure include methods and/or procedures for negotiation of policies for BDT between an AF and CN. These exemplary methods and/or procedures can be performed by an AF associated with an application service provider, ASP.

The exemplary methods and/or procedures can include negotiating one or more first BDT policies with the CN. The exemplary methods and/or procedures can also include receiving, from the CN, updated BDT policy information for at least one of the first BDT policies that will be affected by network performance. The updated BDT policy information for an affected first BDT policy can include one or more candidate second BDT policies, and/or one or more updated conditions for the affected first BDT policy.

With the method of the second aspect of the present disclosure, the AP can update the negotiated BDT policy between the AP and the CN more efficiently by receiving the updated policy information, which is provided by the PCF in the CN directly. The AP therefore does not have to initiate a renegotiate procedure with the PCF, thereby effectively update the BDT policy with minimum signaling and delay in the negotiation process.

In an embodiment of the present disclosure, the method further comprising the step of:

selecting a further BDT policy from the at least one candidate BDT policy, and sending the selected further BDT policy to the PCF.

It is still possible for the AP select a further BDT policy, from the candidate BDT policies provided by the PCF. The AP then will send the selected further BDT policy to the PCF following the current available procedure of negotiation As an example, the exemplary methods and/or procedures can also include, for each affected first BDT policy for which the updated BDT policy information includes candidate second BDT policies, selecting a second BDT policy from among the one or more candidate second BDT policies. In such embodiments, the exemplary methods and/or procedures can also include sending, to the CN, the selected second BDT policies. For example, the AF provides a second BDT policy that it has selected from among the candidate second BDT policies provided, by the CN, for the affected first BDT policy.

In some embodiments, the one or more updated conditions can include at least one of the following: an updated charging rate, an updated maximum aggregated bitrate, and an updated BDT time window.

In some embodiments, the core network can be a 5GC. In such case, the AF can communicate with (e.g., negotiate and/or exchange BDT policy information) with the a PCF of the 5GC via a network exposure function, NEF, of the 5GC.

Other aspects of the present disclosure include core networks (e.g., nodes and/or functions) and application functions, AFs, that are configured to perform operations corresponding to the exemplary methods and/or procedures described herein. Other exemplary embodiments include non-transitory, computer-readable media storing computer-executable instructions that, when executed by processing circuitry associated with such core network nodes/functions or AFs, configure the same to perform operations corresponding to the exemplary methods and/or procedures described herein.

Specifically, in a third aspect of the present disclosure, there is presented a Policy control function, PCF, in a core network, CN of a telecommunication network, the PCF arranged for updating a background data transfer, BDT, policy negotiated between an application function, AF, and the CN, the PCF comprising a determination equipment and a send equipment, wherein the determination equipment is arranged for:

determining, in response to receiving a notification of degraded network performance of a network area, that the negotiated BDT policy is affected by the degraded network performance and an Application Service Provider, ASP, associated with the negotiated BDT policy requested a warning notification, and for determining, at least based on operator policies, updated BDT policy information for the negotiated BDT policy, wherein the updated BDT policy information comprises at least one of the following:

at least one candidate BDT policy, and
updated conditions for the negotiated BDT policy, and
the send equipment is arranged for sending the updated BDT policy information to the AF.

The PCF is arranged for performing the method in accordance with the first aspect of the present disclosure.

In an embodiment of the present disclosure, the PCF further comprises an update equipment arranged for updating the negotiated BDT policy stored in a data repository based on the updated conditions for the negotiated BDT policy.

In an embodiment of the present disclosure, the updated conditions comprise an updated BDT time window, and the PCF further comprises an identify equipment arranged for identifying one or more user equipment, UE to which the negotiated BDT policy has been applied; and the update equipment is further arranged for updating route-selection policy rules for the identified UE based on the updated BDT time window.

In an embodiment of the present disclosure, the receive equipment is further arranged for receiving, from the AF, a further BDT policy selected by the AF from the at least one candidate BDT policy, and the update equipment is further arranged for updating the negotiated BDT policy to the selected further BDT policy.

In a fourth aspect of the present disclosure, there is presented an Application Function, AF, for updating a background data transfer, BDT, policy negotiated between the AF and a Core Network, CN, in a telecommunication network, the AF comprising a receive equipment arranged for:
receiving, from a Policy Control Function, PCF, in the CN, updated BDT policy information, the updated BDT policy information being determined by the PCF in response to the PCF determining that a current BDT policy between the AF and the CN is affected by degraded network performance and an Application Service Provider, ASP, associated with the current policy requested a warning notification, wherein the updated BDT policy information comprises at least one of the following:
at least one candidate BDT policy, and
updated conditions for the negotiated BDT policy.

The AF is arranged for performing the method in accordance with the second aspect of the present disclosure.

In an embodiment of the present disclosure, the AF further comprises a select equipment and a send equipment, wherein:
the select equipment is arranged for selecting a further BDT policy from the at least one candidate BDT policy, and
the send equipment is arranged for sending the selected further BDT policy to the PCF.

In a fifth aspect of the present disclosure, there is presented a computer program product, comprising a computer readable storage medium storing instructions which, when executed on at least one processor, cause the at least one processor to carry out the method according to the first aspect of the present disclosure.

In a sixth aspect of the present disclosure, there is presented a computer program product, comprising a computer readable storage medium storing instructions which, when executed on at least one processor, cause the at least one processor to carry out the method according to the second aspect of the present disclosure.

The above mentioned and other features and advantages of the disclosure will be best understood from the following description referring to the attached drawings. In the drawings, like reference numerals denote identical parts or parts performing an identical or comparable function or operation.

BRIEF DESCRIPTION OF THE DRAWINGS

FIGS. 15-18 are flow diagrams of exemplary methods and/or procedures for transmission and/or reception of user data that can be implemented, for example, in the exemplary communication systems and/or networks.

DETAILED DESCRIPTION

Figure 1:
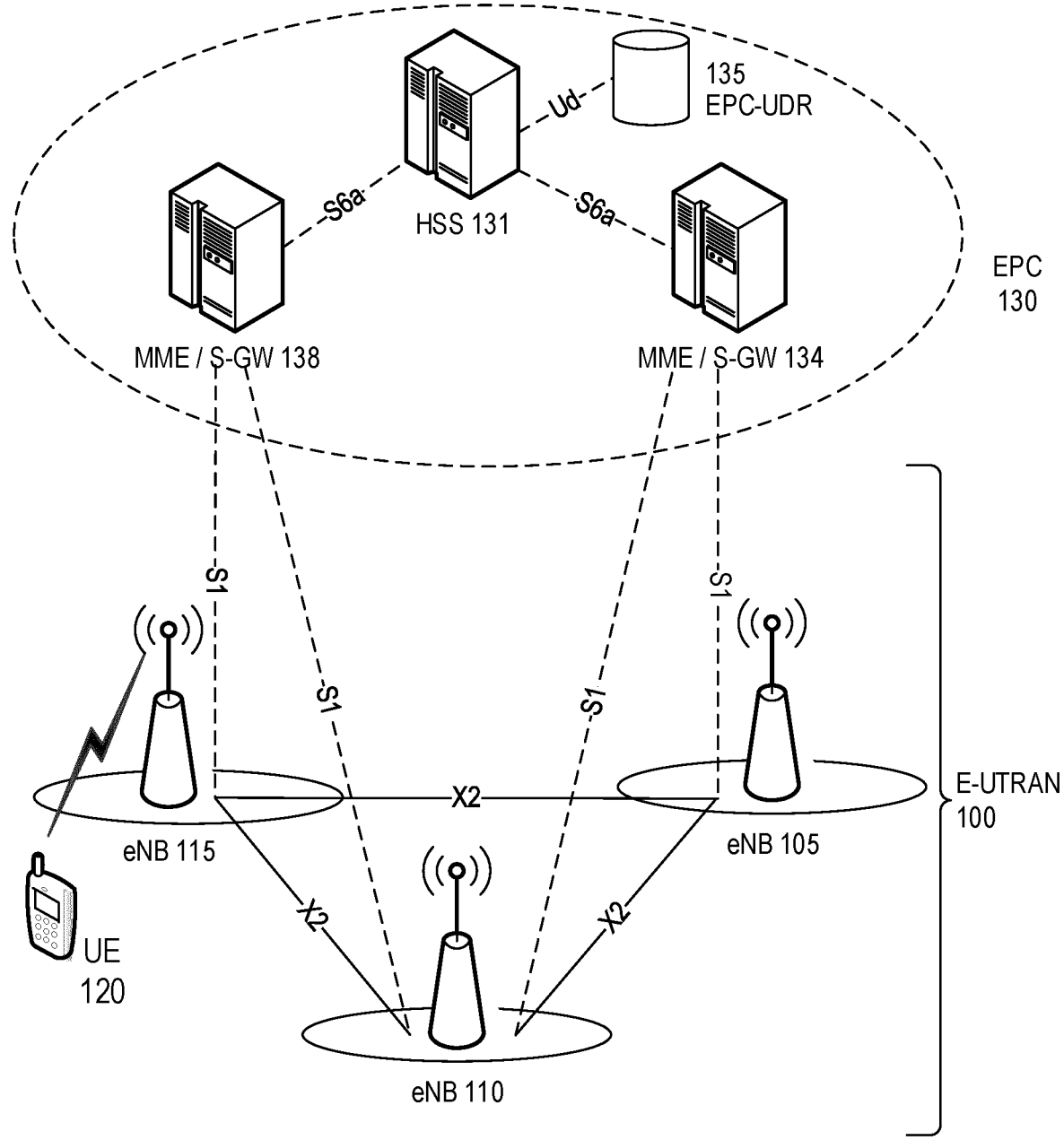
FIG. 1 is a high-level block diagram of an exemplary architecture of the Long-Term Evolution, LTE, Evolved UTRAN, E-UTRAN, and Evolved Packet Core, EPC, network, as standardized by 3GPP.
Figure 2:
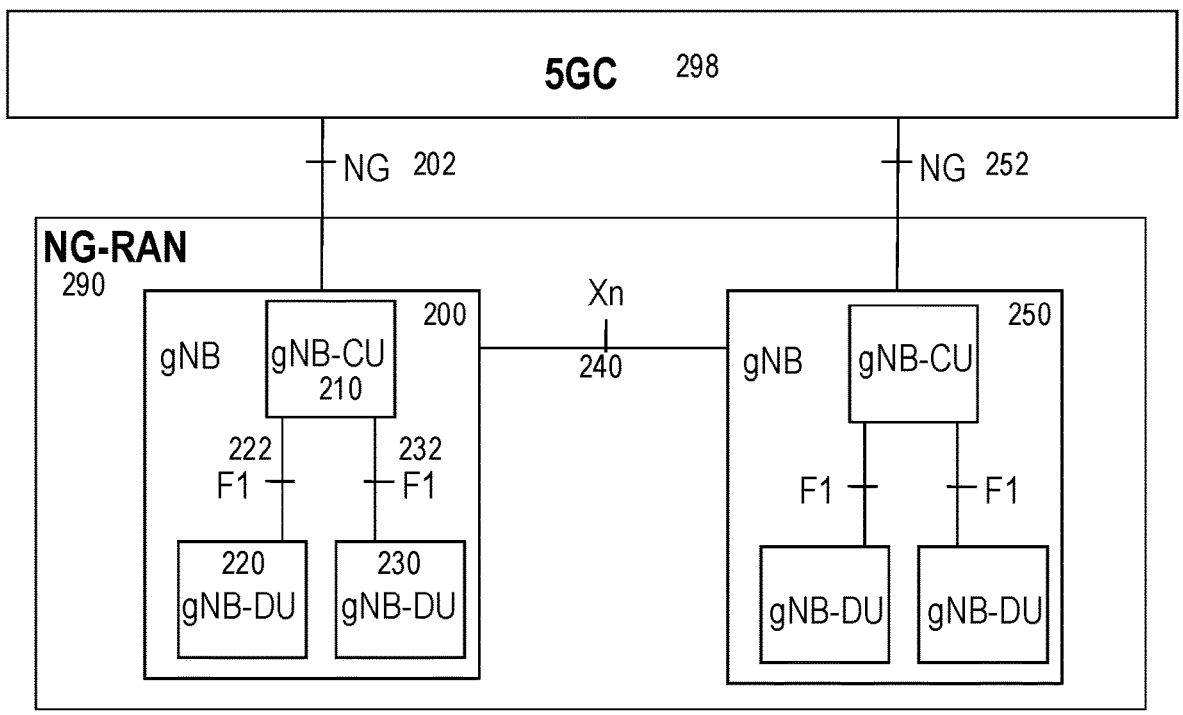
FIGS. 2-3 illustrate two different high-level views of a 5G network architecture.
Figure 3:
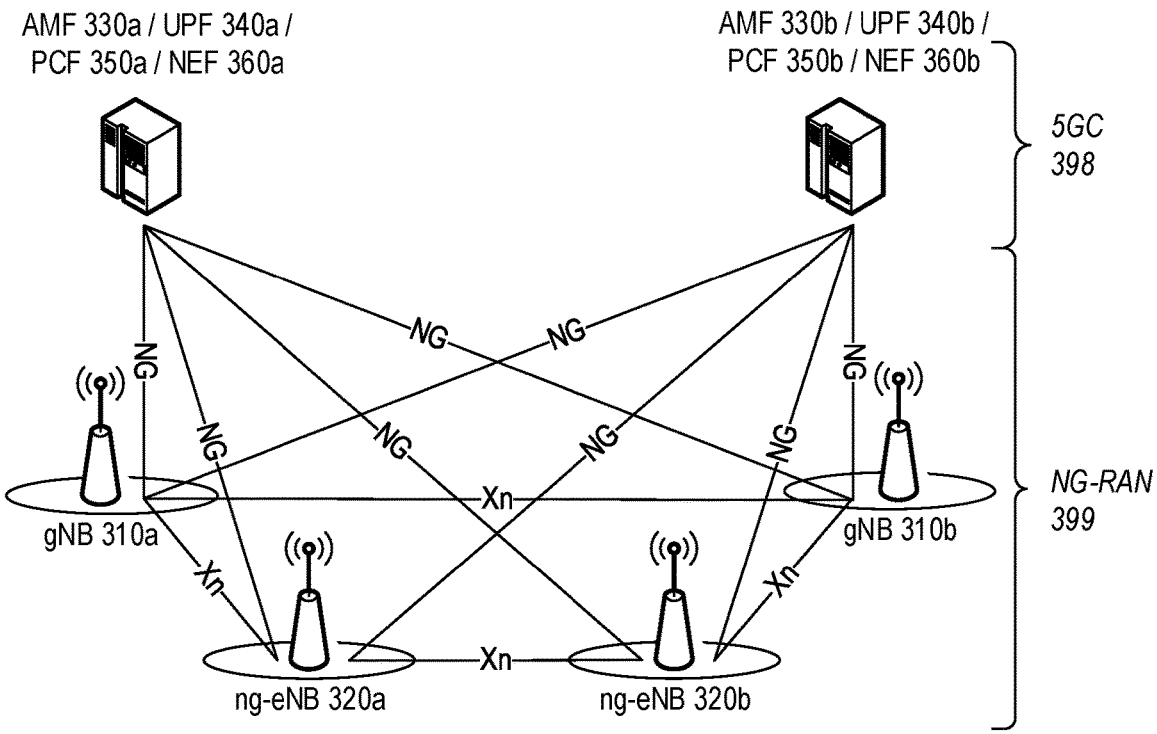

Embodiments contemplated by the present disclosure will now be described in more detail with reference to the accompanying drawings. Other embodiments, however, are contained within the scope of the subject matter disclosed herein. The disclosed subject matter should not be construed as limited to only the embodiments set forth herein. Rather, the illustrated embodiments are provided by way of example to convey the scope of the subject matter to those skilled in the art.

Furthermore, the following terms are used throughout the description given below:
Radio Node: As used herein, a "radio node" can be either a "radio access node" or a "wireless device."

Radio Access Node: As used herein, a "radio access node" (or "radio network node") can be any node in a radio access network, RAN, of a cellular communications network that operates to wirelessly transmit and/or receive signals. Some examples of a radio access node include, but are not limited to, a base station (e.g., a New Radio, NR, base station, gNB, in a 3GPP Fifth Generation, 5G, NR network or an enhanced or evolved Node B, eNB, in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity, MME, a Packet Data Network Gateway, P-GW, a Service Capability Exposure Function SCEF, or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication, MTC, device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the following description, exemplary methods and/or procedures are illustrated in sequence diagrams of block diagrams in a particular order, this order is exemplary and the operations corresponding to the sequences or blocks can be performed in different orders than shown, and can be combined and/or divided into blocks and/or operations having different functionality than shown. Furthermore, the exemplary method and/or procedure can be complementary to other exemplary methods and/or procedures disclosed herein, such that they are capable of being used cooperatively to provide benefits, advantages, and/or solutions to problems described herein. Optional blocks and/or operations are indicated by dashed lines.

In addition, for the sake of brevity, entities illustrated in the sequence diagrams and block diagrams will be referred to without their numerical labels in the description of respective operation steps. Furthermore, the numerical labelling of the operations in the diagrams is only to facilitate clarity of explanation and does not imply a particular order, unless specifically noted in the following description. In other words, the operations can be performed in different order(s) than the numerical labels, unless specifically noted.

As briefly mentioned above, existing solutions allow a MNO to notify an application service provider, ASP, that a BDT policy needs to be renegotiated if the ASP wants to improve the quality of the BDT traffic. Even so, there are various problems and/or limitations with the existing mechanisms for BDT renegotiation. These are discussed in more detail below.

3GPP TS 23.503 (v16.1.0) specifies features for negotiation of BDT between an ASP and a mobile network operator, MNO, and/or a public land mobile network, PLMN. In addition, 3GPP TS 23.502 (v16.1.1, clause 4.16.7) defines a procedure to support negotiation for future BDT in which the service provides the network with information about involved UE(s), amount of data to be transferred, etc. In order to enable this negotiation, the ASP contacts the NEF to indicate the volume of data to be transferred per UE and the expected number of UEs, as well as the time window and the network geographical area where the transfer will take place. The NEF contacts the PCF to inform that there is a request to negotiate a BDT. The PCF generates one or multiple BDT policies.

The service then negotiates with the network for some specific time windows to be used for transmission. A generated/selected BDT policy can include a recommended time window for BDT, a reference to a charging rate used for this time window, a BDT reference ID, network area information, and a maximum aggregated bitrate for the BDT. The BDT policy can be generated/selected taking into account multiple sources of data, including the "Network Performance" Analytics that provides the tuple {expected load in the area of interest, expected number of UEs of this ASP in the Area of Interest}.

The PCF provides a candidate list of BDT policies or a selected BDT policy to the AF, via NEF, together with the BDT reference ID. If the AF received more than one background transfer policy, the AF can select one of them and inform the PCF about the selected background transfer policy that is stored in the UDR.

When the ASP initiates negotiation of BDT, it may also provide an indication that a BDT warning notification should be sent to the AF. A BDT warning notification indicates to the ASP that the BDT policy needs to be re-negotiated.

The conditions to re-negotiate a BDT policy include: 1) the network performance in the area of interest decreases below a threshold; 2) the negotiated BDT policies are affected by this decrease. In such case, the PCF notifies the ASP. When the AF receives the notification, the AF may renegotiate the BDT policy with the PCF, which can lead to improvements in the quality of background data traffic.

The existing solution allows a MNO to notify the ASP that a BDT policy needs to be renegotiated if the ASP wants to improve the quality of the BDT traffic. Even so, there are various problems and/or limitations with the existing mechanisms for BDT renegotiation.

For example, the previously-negotiated BDT policy remains active; in particular, the charging and rate limit of the existing BDT policy still applies. The MNO has no mechanism to improve the network conditions, for example, by applying a more restrictive rate limitation or by applying a different charging to the BDT traffic that will be routed in a network area that may experience heavy load.

Furthermore, if the ASP wants to improve the quality of the BDT traffic, then it must initiate the negotiation of new BDT policies. However, as mentioned above, the previously-negotiated BDT policy applies until the negotiation of new BDT policies is completed. This causes extra signalling between the MNO and the ASP and delays the application of new BDT policies according to the new network conditions. Furthermore, if a BDT session is already ongoing, the decision of when to send BDT is left to the ASP only, i.e., the network has no control over timing.

Exemplary embodiments of the present disclosure address these and other problems, challenges, and/or issues by providing techniques to update the conditions that apply to a negotiated BDT policy according to the new network performance conditions, and to initiate a re-negotiation of a new BDT policy from the MNO point of view.

For example, a PCF decides whether new conditions (e.g., charging rate and maximum aggregated bitrate) apply to the negotiated BDT policy and informs the ASP. Additionally, the PCF can generate a new set of candidate BDT policies according to the new network performance information and other input data, and can provide this new set of candidate BDT policies to the ASP. The ASP can select one BDT policy out of the candidate set. In this manner, the BDT renegotiation can be initiated by the MNO (e.g., a PCF in the CN) rather than the ASP.

Such techniques provide various advantages. For example, they enable the MNO to control the conditions for applying BDT when the analytics data (e.g., predictions) regarding network performance indicate an increase or decrease of network load in an affected area, as well as to control a time at which a negotiated BDT should occur.

In addition, such techniques provide the MNO with control of the initiation of BDT renegotiation, and therefore a better control of the BDT traffic in MNO's network. Furthermore, such techniques provide a compact mechanism for renegotiation of the BDT policies with minimum signalling and delay during the renegotiation.

In the present disclosure, the term "network" is used generally to refer to a communication infrastructure between two nodes, e.g., cellular networks and sidelink (ad-hoc) communication.

In addition, the term "service" is used generally herein to refer to a set of data, associated with one or more applications, that is to be transferred via a network with certain specific delivery requirements that need to be fulfilled in order to make the applications successful.

An example of a service could be a huge amount of data (e.g., a software update or upload of data) that may or may not be segmented into smaller chunks for efficient delivery. Another example is a set of independent files that are associated with information relevant to the same service. The service could have an associated transmission deadline, either in time (e.g., complete the transmission within 1 hour) or spatial domain (e.g., complete the transmission before the UE reaches a certain geographical area). The service could also provide additional information useful for the delivery of the service.

In the present disclosure, the term "component" is used generally to refer to any component needed for the delivery of the service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", a term used generally to refer to an entity that can collect historical information about utilization of resources as well as provide information about the current and the predicted future availability of resources associated with that component (e.g., a RAN manager).

Figure 5:
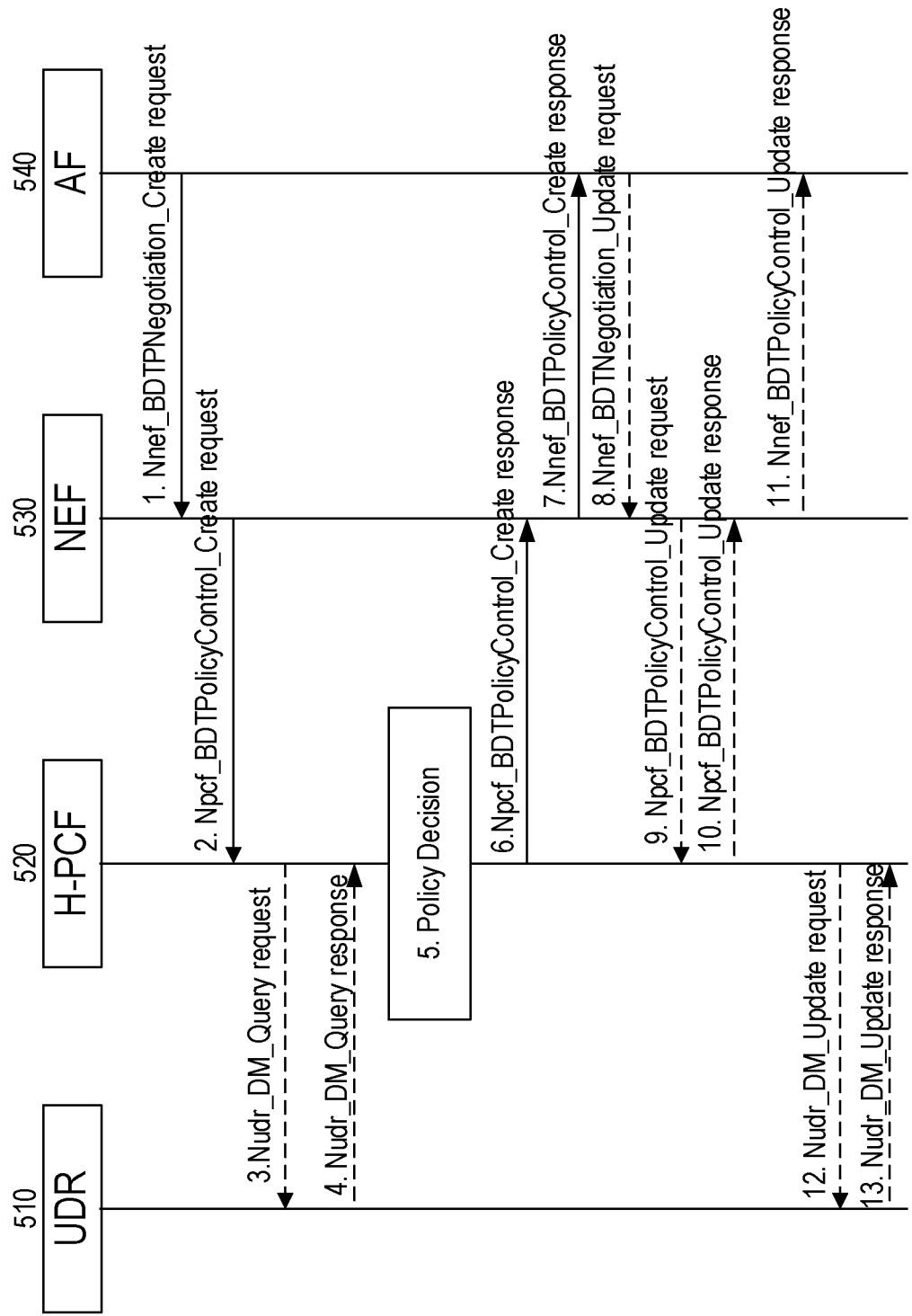
FIG. 5 shows an exemplary procedure for negotiation of background data transfer, BDT, such as described in 3GPP TS 23.502 (v16.1.1).

FIG. 5 shows an exemplary procedure for negotiation of BDT, such as defined in 3GPP TS 23.502 (v16.1.1). The procedure involves various operations by and/or between a UDR 510, a home PCF (H-PCF, or more simply PCF) 520, a NEF 530, and an AF 540, which can be associated with an ASP.

In operation 1, the AF invokes the Nnef_BDTPNegotiation_Create service of the NEF with an input tuple of {ASP id, Number of UEs, Volume per UE, Desired time window, and optionally External Group Identifier, Network Area Information, Reset request for notification}. The Reset request for notification is an indication that BDT warning notification should be sent to the AF.

In operation 2, based on the AF request, the NEF can request UDM to translate the External Group Identifier into the Internal Group Identifier using the service Nudm_SDM_Get (Group Identifier Translation, External Group Identifier). In addition, the NEF can invoke the Npcf_BDTPolicyControl_Create service of the H-PCF with the input tuple {ASP id, Number of UEs, Volume per UE, Desired time window and optionally Internal Group Identifier, the Network Area Information, Reset request for notification} to authorize the creation of the policy regarding the BDT. If the PCF was provided with Reset request for notification, then PCF can send BDT warning notification to the AF.

In operation 3, the PCF may request from the UDR the stored transfer policies for all the ASPs using Nudr_DM_Query (Policy Data, Background Data Transfer) service operation. In case only one PCF is deployed in the PLMN, the transfer policy can be locally stored and no interaction with UDR is required.

In operation 4, the UDR provides all the stored transfer policies and corresponding network area information to the PCF, as needed. In operation 5, the PCF determines one or more BDT policies based on information provided by the AF and other available information. The PCF may interact with the NWDAF and request analytics information on the number of UEs and the load in the area of interest including one or multiple time periods.

In operation 6, the PCF send the acknowledge message to the NEF with the acceptable BDT policies and a BDT Reference ID. In operation 7, the NEF sends a Nnef_BDTPNegotiation_Create response to the AF to provide one or more BDT policies and the BDT Reference ID to the AF. The AF stores the BDT Reference ID for future interaction with the PCF.

If the NEF received only one background transfer policy from the PCF, operations 8-11 are not executed and the procedure proceeds to operation 12. Otherwise, in operation 8, The AF invokes the Nnef_BDTPNegotiation_Update service to provide the NEF with BDT Reference ID and the selected BDT policy. In operation 9, the NEF invokes the Npcf_BDTPolicyControl_Update service to provide the PCF with the selected BDT policy and the associated BDT Reference ID. In operation 10, the PCF sends an acknowledge message to the NEF, and in operation 11, the NEF sends an acknowledge message to the AF.

In operation 12, the PCF stores the BDT Reference ID together with the new BDT policy, the corresponding network area information, and optionally the information of request for notification in the UDR by invoking Nudr_DM_Update (BDT Reference id, Policy Data, Background Data Transfer, updated data) service.

However, operation 12 can be omitted when the PCF decides to locally store the BDT policy.

In operation 13, the UDR sends a response to the H-PCF as its acknowledgement.

Figure 6:
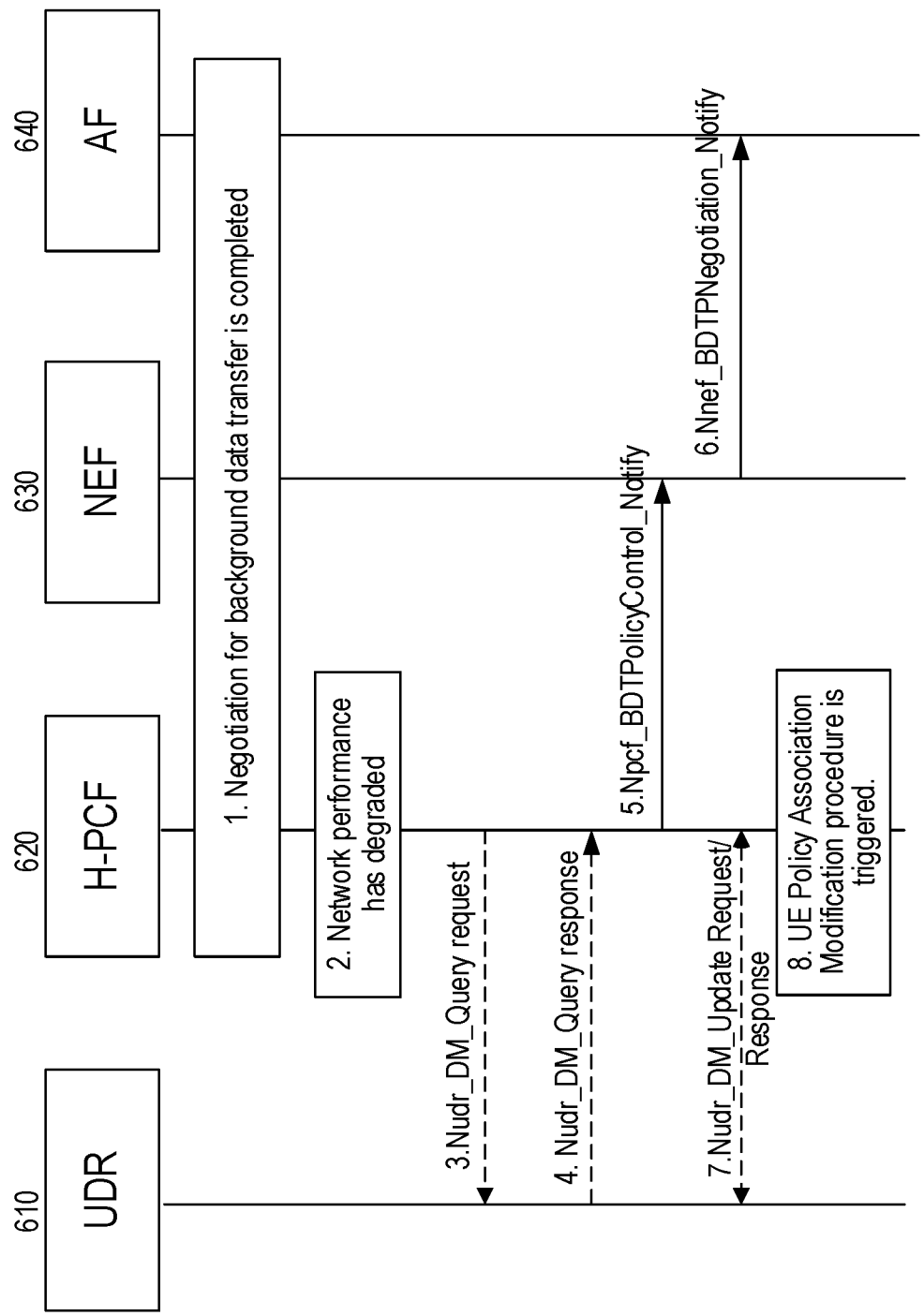
FIG. 6 shows an exemplary procedure for BDT warning notification, according to various exemplary embodiments of the present disclosure.

FIG. 6 shows an exemplary procedure for BDT warning notification, according to various exemplary embodiments of the present disclosure. The procedure involves various operations by and/or between a UDR 610, a H-PCF (or more simply PCF) 620, a NEF 630, and an AF 640, which can be associated with an ASP. Each of these entities correspond to similarly-numbered entities in FIG. 5.

In operation 1, a negotiation for BDT is performed, such as described in 3GPP TS 23.502 clause 4.16.7.2 and illustrated by operations 1-7 of the exemplary procedure shown in FIG. 5. In operation 2, the PCF is notified when the network performance in the area of interest goes below the criteria set by the operator from the NWDAF, as described in 3GPP TS 23.288 (v16.1.0). In operation 3, the PCF may request from the UDR the stored transfer policies using Nudr_DM_Query (Policy Data, Background Data Transfer) service operation.

In operation 4, the UDR provides all the BDT policies to the PCF, which identifies the ones affected by the notification received from NWDAF. For each of them, the PCF determines the ASP of which the background traffic will be influenced by the degradation of network performance and which requested the H-PCF to send the notification. The PCF then determines, based on operator policies, the new network performance information and other input data, whether a new list of candidate BDT policies and/or updated conditions for the previously negotiated BDT policy need(s) to be calculated.

In operation 5, the PCF sends the notification to the NEF by invoking Npcf_BDTPolicyControl_Notify service with the tuple {BDT reference ID, network area information (optional), time window, list of candidate background transfer policies, updated conditions for previously negotiated background transfer policy}.

In operation 6, the NEF notifies the AF by invoking Nnef_BDTPNegotiation_Notify service with the information received in operation 5, i.e., the tuple {BDT reference ID, network area information (optional), time window, list of candidate background transfer policies, updated conditions for previously negotiated background transfer policy}.

In operation 7, if updated conditions for the previously-negotiated BDT policy are included in the notification, the PCF updates the BDT policy stored in the UDR for the corresponding BDT reference ID. Although shown as a single operation, this involves a request/response pair.

In operation 8, if there is a change in the negotiated time window for the BDT policy in the UDR, the PCF triggers a UE Policy Association Modification procedure (as defined in 3GPP TS 23.502 clause 4.16.12.2) to identify the UEs to which the BDT policy has been applied and to update UE route selection policy, URSP, rules with new validation criteria.

Figure 7:
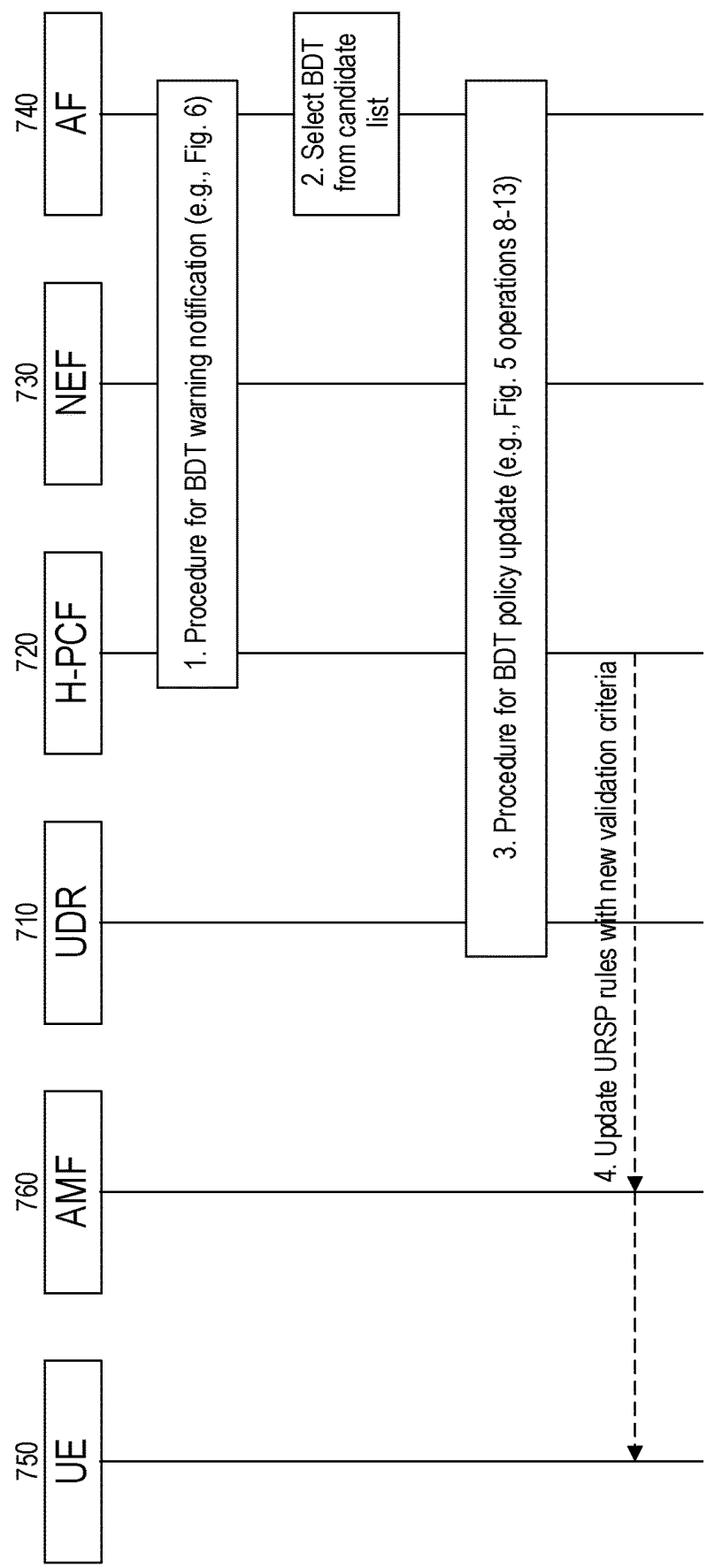
FIG. 7 shows an exemplary procedure for BDT renegotiation, according to various exemplary embodiments of the present disclosure.

FIG. 7 shows an exemplary procedure for BDT renegotiation, according to various exemplary embodiments of the present disclosure. The procedure involves various operations by and/or between a UDR 710, a H-PCF (or more simply PCF) 720, a NEF 730, and an AF 740, which can be associated with an ASP. Each of these entities correspond to similarly-numbered entities in FIGS. 5-6. In addition, various operations in FIG. 7 involve a UE 750 and an AMF 760.

More specifically, the procedure shown in FIG. 7 is a new procedure allowing an ASP (e.g., an AF) to select one of the candidate BDT policies provided by PCF and to update the URSP for affected UE(s) with new validity conditions.

Operation 1 involves performing a procedure for BDT warning notification, such as shown in FIG. 6 described above. Assuming that the AF has received a candidate list of BDT polices (e.g., in FIG. 6 operation 6), the AF may select a BDT policy from the candidate list in operation 2 of FIG. 7. However, if the AF doesn't select any of the candidate BDT policies, any updated conditions of the previously-negotiated BDT policy will be applied and the subsequent operations of FIG. 7 can be omitted.

If the AF selects a candidate BDT policy, operations 3-4 of FIG. 7 are performed. Operation 3 involves performing a procedure for BDT policy update such as shown in operations 8-13 of FIG. 5, described above.

In operation 4, if there is a change in the negotiated time window for the selected BDT policy in the UDR, the PCF triggers a UE Policy Association Modification procedure (as defined in 3GPP TS 23.502 clause 4.16.12.2) to identify the UEs to which the BDT policy has been applied and to update UE route selection policy (URSP) rules with new validation criteria.

Tables 1 and 2 describe exemplary service operations for PCF and NEF, respectively, that can be used in the exemplary procedures described above.

TABLE 1

| | |
|---|---|
| Operation name | Npcf_BDTPolicyControl_Notify |
| Description | This service operation sends the BDT warning notification to the NF consumer. |
| Required inputs | BDT reference ID |
| Optional inputs | Network Area Information, time window, list of candidate background transfer policies, updated conditions for previously negotiated background transfer policy |
| Required outputs | None |
| Optional outputs | None |

TABLE 2

| | |
|---|---|
| Operation name | Nnef_BDTPNegotiation_Notify |
| Description | NEF sends the BDT warning notification to the NF consumer. |
| Required inputs | BDT reference ID |
| Optional inputs | Network Area Information, time window, list of candidate background transfer policies, updated conditions for previously negotiated background transfer policy |
| Required outputs | None |
| Optional outputs | None |

Figure 8:
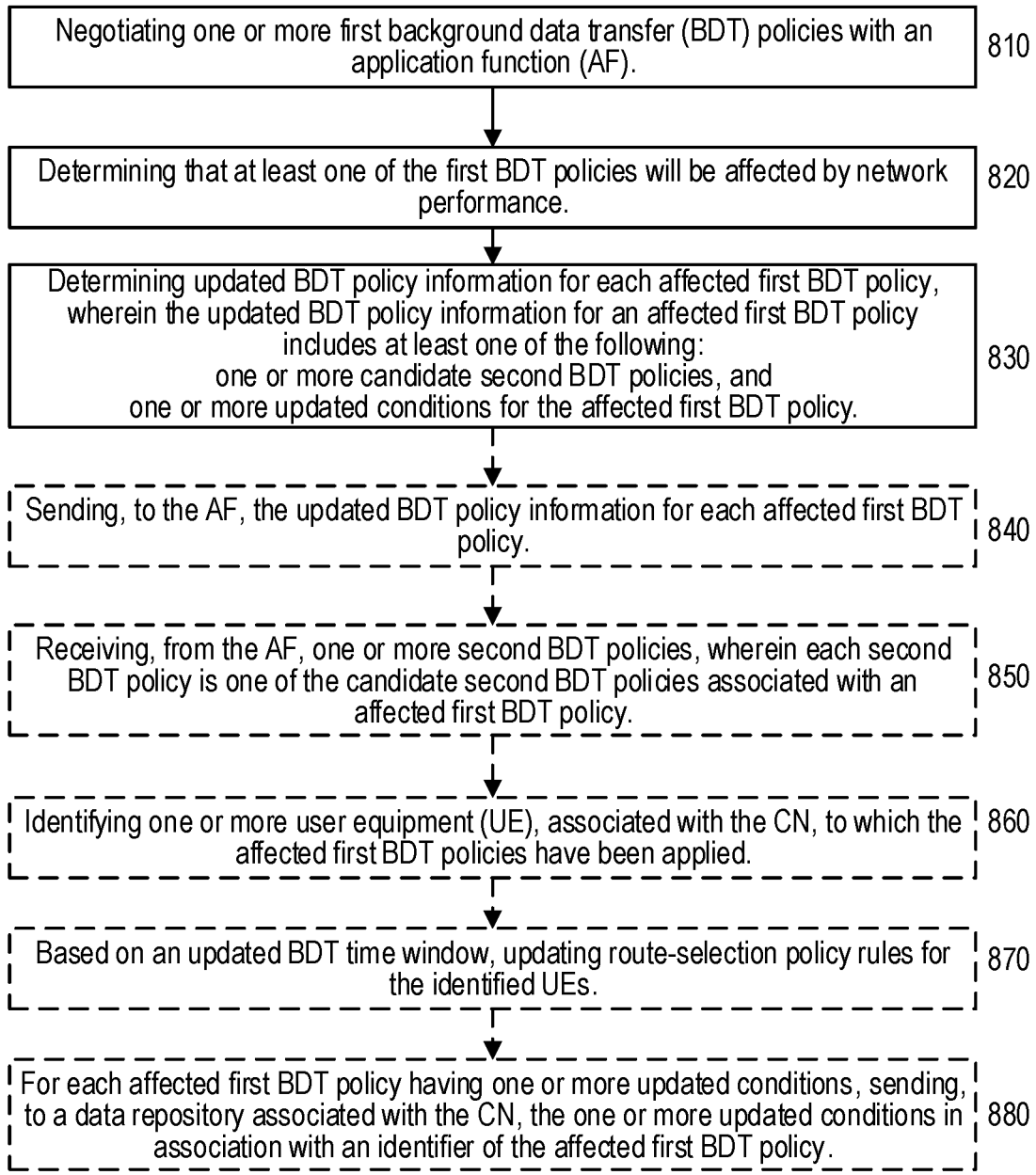
FIG. 8 illustrates exemplary methods and/or procedures for scheduling resources, associated with a plurality of components of a communication network, for providing a network service to a user equipment, UE, according to various exemplary embodiments of the present disclosure.

FIG. 8 illustrates an exemplary method and/or procedure for negotiation of policies for BDT between an AF and a CN) according to various exemplary embodiments of the present disclosure. The exemplary method and/or procedure shown in FIG. 8 can be performed by one or more nodes or functions in the CN, such as a PCF, e.g., such as a policy control node described herein.

The exemplary method and/or procedure shown in FIG. 8 can be complementary to other exemplary methods and/or procedures disclosed herein (e.g., FIGS. 5-7 and 9), such that they are capable of being used cooperatively to provide benefits, advantages, and/or solutions to problems described herein The exemplary method and/or procedure can include the operations of block 810, in which the core network can negotiate one or more first BDT policies with the AF. Various exemplary first BDT polices are described above. The negotiation can include multiple operations such as operations 1-7 shown in FIG. 5.

The exemplary method and/or procedure can also include the operations of block 820, in which the core network can determine that at least one of the first BDT policies will be affected by network performance (e.g., load or congestion).

The exemplary method and/or procedure can also include the operations of block 830, in which the core network can determine updated BDT policy information for each affected first BDT policy, based on operator policies, the new network performance information and other input data.

The updated BDT policy information for an affected first BDT policy can include one or more candidate second BDT policies, and/or one or more updated conditions for the affected first BDT policy.

In an embodiment, the one or more updated conditions can include at least one of the following: an updated charging rate and an updated maximum aggregated bitrate.

The one or more updated conditions can further include an updated BDT time window. In this case, the exemplary method and/or procedure can also include the operations of blocks 860-870. In block 860, the core network can identify one or more UE, associated with the CN, to which the affected first BDT policies have been applied. In block 870, the core network can, based on the updated BDT time window, update route-selection policy rules for the identified UEs (e.g., URSP rules).

In a further embodiment, the exemplary method and/or procedure can also include the operations of block 840, where the core network can send, to the AF, the updated BDT policy information for each affected first BDT policy.

In response to receiving the updated BDT policy information, the exemplary method and/or procedure can also include the operations of block 850, where the core network can receive, from the AF, one or more second BDT policies, wherein each second BDT policy is one of the candidate second BDT policies associated with an affected first BDT policy.

For example, the AF provides a second BDT policy that it has selected from among the candidate second BDT policies provided, by the CN, for the affected first BDT policy.

In an embodiment, the exemplary method and/or procedure can also include the operations of blocks 880, where for each affected first BDT policy having one or more updated conditions, the core network can send, to a data repository (e.g. UDR), the one or more updated conditions in association with an identifier of the affected first BDT policy (e.g., BDT reference ID).

As an embodiment, the core network can be a 5GC and the method is performed by a PCF in the 5GC. In such case, the PCF can communicate with (e.g., negotiate and/or exchange BDT policy information) with the AF via a NEF in the 5GC.

Figure 9:
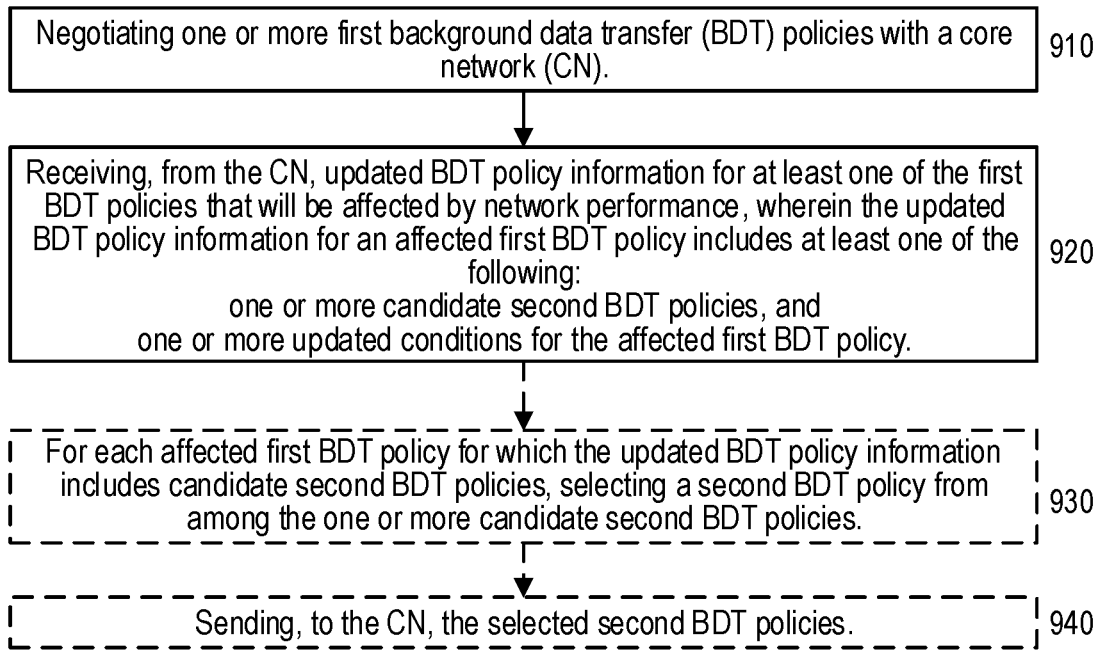
FIG. 9 illustrates exemplary methods and/or procedures for scheduling resources, in a component of a communication network, for providing a network service to a UE, according to various exemplary embodiments of the present disclosure.

FIG. 9 illustrates an exemplary method and/or procedure for negotiation of policies for BDT between an AF and a CN, according to various exemplary embodiments of the present disclosure. The exemplary method and/or procedure shown in FIG. 9 can be performed by an AF, such as described herein.

The exemplary method and/or procedure can include the operations of block 910, where the AF can negotiate one or more first BDT policies with the CN. Various exemplary first BDT polices are described above. The negotiation can include multiple operations such as operations 1-7 shown in FIG. 5.

The exemplary method and/or procedure can include the operations of block 920, where the AF can receive, from the CN, updated BDT policy information for at least one of the first BDT policies that will be affected by network performance.

The updated BDT policy information for an affected first BDT policy can include one or more candidate second BDT policies, and/or one or more updated conditions for the affected first BDT policy. In some embodiments, the one or more updated conditions can include at least one of the following: an updated charging rate, an updated maximum aggregated bitrate, and an updated BDT time window.

In some embodiments, the exemplary method and/or procedure can also include the operations of blocks 930, where for each affected first BDT policy for which the updated BDT policy information includes candidate second BDT policies, the AF can select a second BDT policy from among the one or more candidate second BDT policies. In such embodiments, the exemplary method and/or procedure can also include the operations of block 940, where the AF can send, to the CN, the selected second BDT policies. For example, the AF provides a second BDT policy that it has selected from among the candidate second BDT policies provided, by the CN, for the affected first BDT policy.

In some embodiments, the core network can be a 5GC. In such case, the AF can communicate with (e.g., negotiate and/or exchange BDT policy information) with the a PCF of the 5GC via a NEF of the 5GC.

Figure 10:
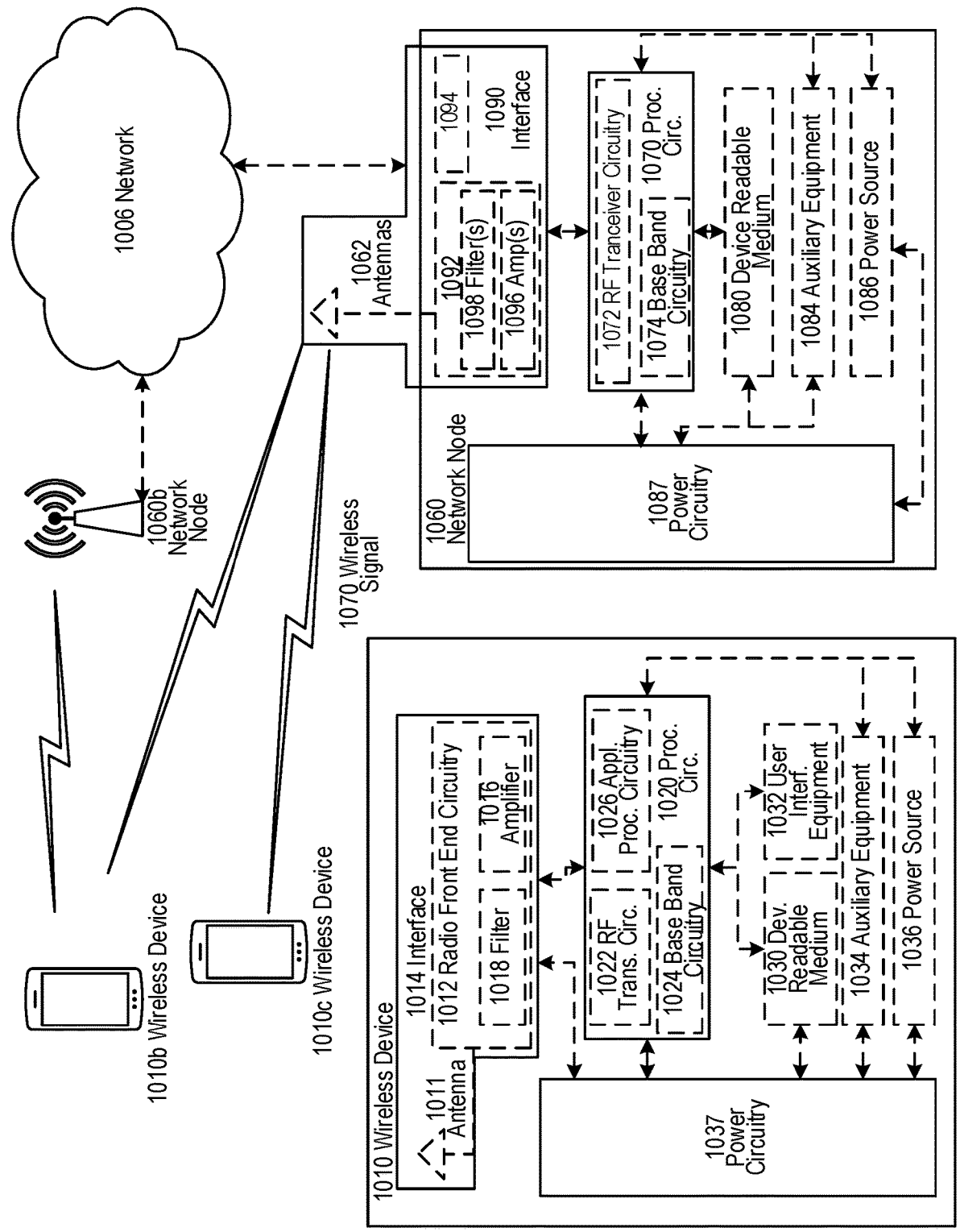
FIG. 10 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c.

In practice, a wireless network can further include any additional elements suitable to support communication between wireless devices or between a wireless device and another communication device, such as a landline telephone, a service provider, or any other network node or end device. Of the illustrated components, network node 1060 and wireless device, WD 1010, are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications, GSM, Universal Mobile Telecommunications System, UMTS, Long Term Evolution, LTE, and/or other suitable 2G, 3G, 4G, or 5G standards; wireless local area network, WLAN, standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks, PSTNs, packet data networks, optical networks, wide-area networks, WANs, local area networks, LANs, wireless local area networks, WLANs, wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points, Aps, e.g., radio access points, base stations, BSs, e.g., radio base stations, NBs, eNBs, gNBs, or components thereof. Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay.

A network node can also include one or more (or all) parts of a distributed radio base station such as centralized digital units and/or remote radio units, RRUs, sometimes referred to as Remote Radio Heads, RRHs. Such remote radio units may or may not be integrated with an antenna as an antenna integrated radio. Parts of a distributed radio base station can also be referred to as nodes in a distributed antenna system, DAS.

Further examples of network nodes include multi-standard radio, MSR, equipment such as MSR BSs, network controllers such as radio network controllers, RNCs, or base station controllers, BSCs, base transceiver stations, BTSs, transmission points, transmission nodes, multi-cell/multicast coordination entities, MCEs, core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other embodiments can comprise network nodes with different combinations of components.

It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and a RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1060 can be configured to support multiple radio access technologies (RATs). In such embodiments, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, DSP, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 can execute instructions stored in device readable medium 1080 or in memory within processing circuitry 1070. Such functionality can include providing any of the various wireless features, functions, or benefits discussed herein. In some embodiments, processing circuitry 1070 can include a system on a chip, SOC.

In some embodiments, processing circuitry 1070 can include one or more of radio frequency, RF, transceiver circuitry 1072 and baseband processing circuitry 1074. In some embodiments, RF transceiver circuitry 1072 and baseband processing circuitry 1074 can be on separate chips (or sets of chips), boards, or units, such as radio units and digital units. In alternative embodiments, part or all of RF transceiver circuitry 1072 and baseband processing circuitry 1074 can be on the same chip or set of chips, boards, or units In certain embodiments, some or all of the functionality described herein as being provided by a network node, base station, eNB or other such network device can be performed by processing circuitry 1070 executing instructions stored on device readable medium 1080 or memory within processing circuitry 1070. In alternative embodiments, some or all of the functionality can be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some embodiments, processing circuitry 1070 and device readable medium 1080 can be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain embodiments a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other embodiments, the interface can comprise different components and/or different combinations of components.

In certain alternative embodiments, network node 1060 may not include separate radio front end circuitry 1092, instead, processing circuitry 1070 can comprise radio front end circuitry and can be connected to antenna 1062 without separate radio front end circuitry 1092. Similarly, in some embodiments, all or some of RF transceiver circuitry 1072 can be considered a part of interface 1090. In still other embodiments, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some embodiments, antenna 1062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative embodiments of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

In some embodiments, a WD, e.g. WD 1010, can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal. As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1014. In certain alternative embodiments, antenna 1011 can be separate from WD 1010 and be connectable to WD 1010 through an interface or port. Antenna 1011, interface 1014, and/or processing circuitry 1020 can be configured to perform any receiving or transmitting operations described herein as being performed by a WD. Any information, data and/or signals can be received from a network node and/or another WD. In some embodiments, radio front end circuitry and/or antenna 1011 can be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and can be configured to condition signals communicated between antenna 1011 and processing circuitry 1020. Radio front end circuitry 1012 can be coupled to or a part of antenna 1011. In some embodiments, WD 1010 may not include separate radio front end circuitry 1012; rather, processing circuitry 1020 can comprise radio front end circuitry and can be connected to antenna 1011. Similarly, in some embodiments, some or all of RF transceiver circuitry 1022 can be considered a part of interface 1014. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other embodiments, the interface can comprise different components and/or different combinations of components.

Processing circuitry 1020 can comprise a combination of one or more of a microprocessor, controller, microcontroller, central processing unit, DSP, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality can include providing any of the various wireless features or benefits discussed herein. For example, processing circuitry 1020 can execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry can comprise different components and/or different combinations of components. In certain embodiments processing circuitry 1020 of WD 1010 can comprise a SOC. In some embodiments, RF transceiver circuitry 1022, baseband processing circuitry 1024, and application processing circuitry 1026 can be on separate chips or sets of chips. In alternative embodiments, part or all of baseband processing circuitry 1024 and application processing circuitry 1026 can be combined into one chip or set of chips, and RF transceiver circuitry 1022 can be on a separate chip or set of chips. In still alternative embodiments, part or all of RF transceiver circuitry 1022 and baseband processing circuitry 1024 can be on the same chip or set of chips, and application processing circuitry 1026 can be on a separate chip or set of chips. In yet other alternative embodiments, part or all of RF transceiver circuitry 1022, baseband processing circuitry 1024, and application processing circuitry 1026 can be combined in the same chip or set of chips. In some embodiments, RF transceiver circuitry 1022 can be a part of interface 1014. RF transceiver circuitry 1022 can condition RF signals for processing circuitry 1020.

In certain embodiments, some or all of the functionality described herein as being performed by a WD can be provided by processing circuitry 1020 executing instructions stored on device readable medium 1030, which in certain embodiments can be a computer-readable storage medium. In alternative embodiments, some or all of the functionality can be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., RAM or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some embodiments, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010, and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network, and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the embodiment and/or scenario.

Power source 1036 can, in some embodiments, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain embodiments comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain embodiments be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
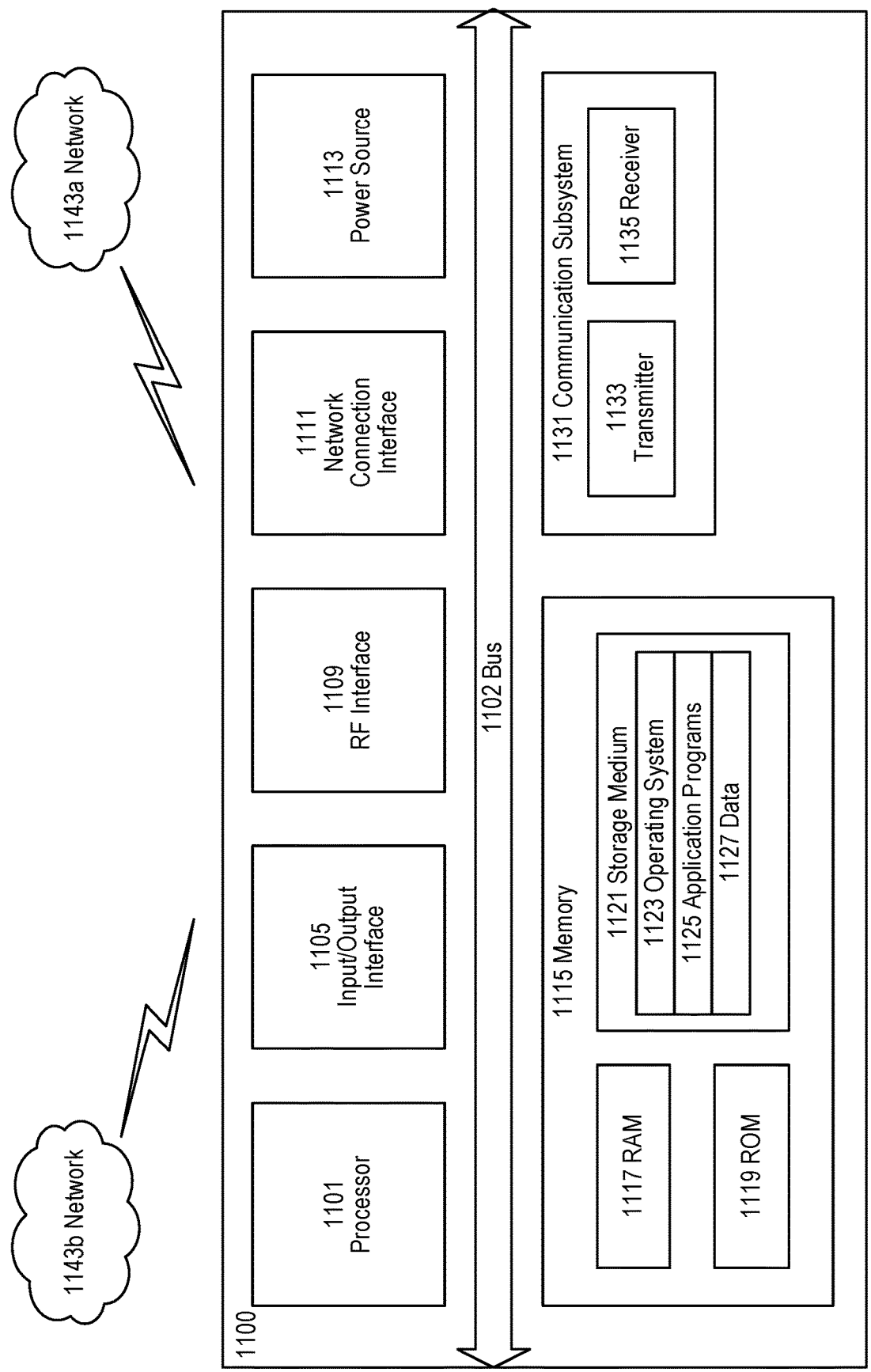
FIG. 11 illustrates an exemplary embodiment of a UE, in accordance with various aspects described herein.

FIG. 11 illustrates one embodiment of a UE in accordance with various aspects described herein. As used herein, a UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 11200 can be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, RF interface 1109, network connection interface 1111, memory 1115 including RAM 1117, ROM 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 1101 can include two central processing units (CPUs). Data can be information in a form suitable for use by a computer.

In the depicted embodiment, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143a. Network 1143a can encompass wired and/or wireless networks such as a local-area network (LAN), a wide-area network (WAN), a computer network, a wireless network, a telecommunications network, another like network or any combination thereof. For example, network 1143a can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 can be configured to include operating system 1123, application program 1125 such as a web browser application, a widget or gadget engine or another application, and data file 1127. Storage medium 1121 can store, for use by UE 1100, any of a variety of various operating systems or combinations of operating systems.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143b using communication subsystem 1131. Network 1143a and network 1143b can be the same network or networks or different network or networks. Communication subsystem 1131 can be configured to include one or more transceivers used to communicate with network 1143b. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated embodiment, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143*b* can encompass wired and/or wireless networks such as an LAN, a WAN, a computer network, a wireless network, a telecommunications network, another like network or any combination thereof. For example, network 1143*b* can be a cellular network, a Wi-Fi network, and/or a near-field network. Power source 1113 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
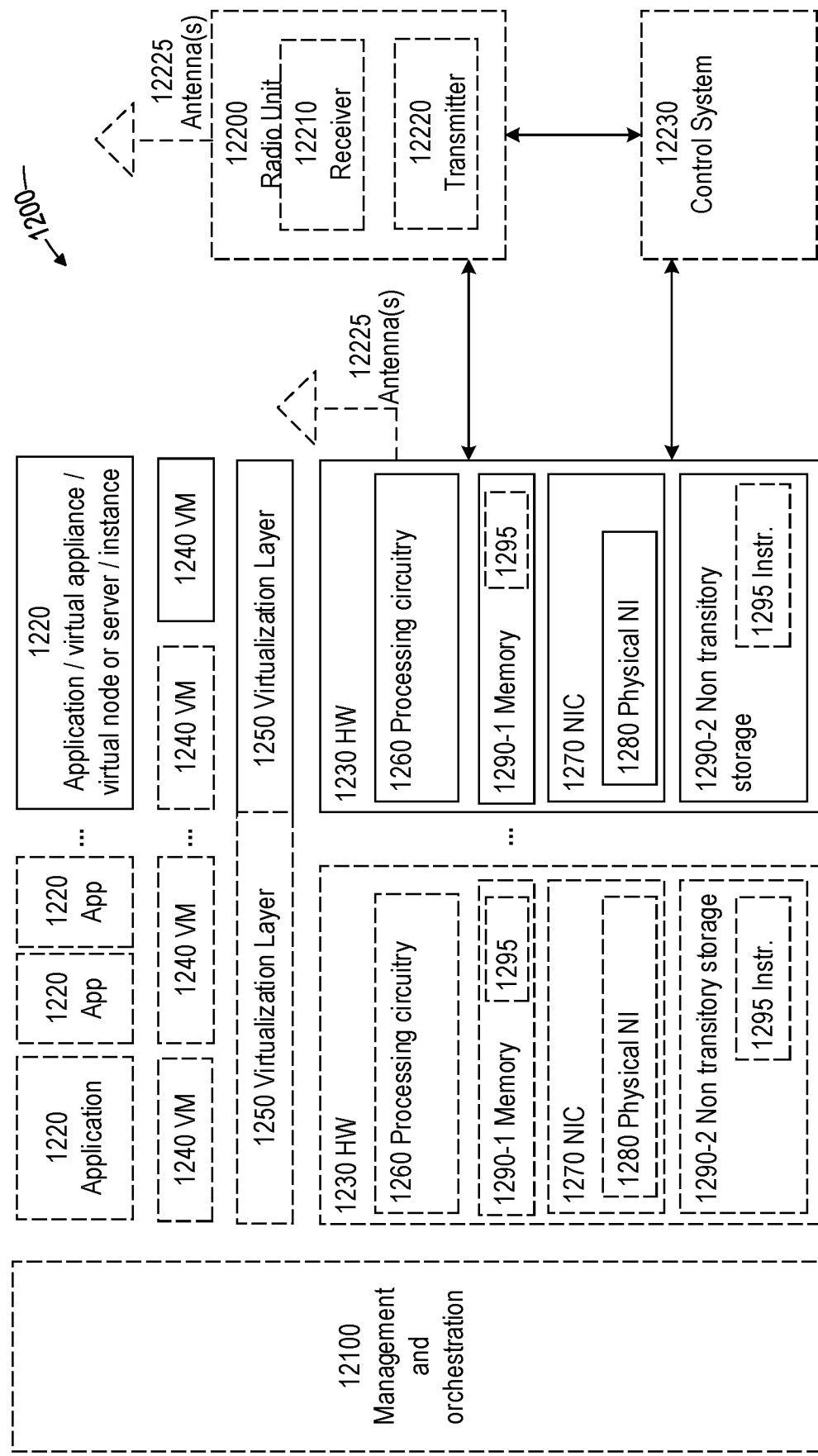
FIG. 12 is a block diagram illustrating an exemplary virtualization environment usable for implementation of various embodiments of network nodes described herein.

FIG. 12 is a schematic block diagram illustrating a virtualization environment 1200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node can be entirely virtualized.

The functions can be implemented by one or more applications 1220 (which can alternatively be called software instances, virtual appliances, network functions, virtual nodes, virtual network functions, application functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and can be run by a corresponding virtualization layer 1250 or hypervisor. Different embodiments of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g., such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE). Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station.

In some embodiments, some signalling can be effected by control system 12230 which can alternatively be used for communication between the hardware nodes 1230 and radio units 12200.

Figure 13:
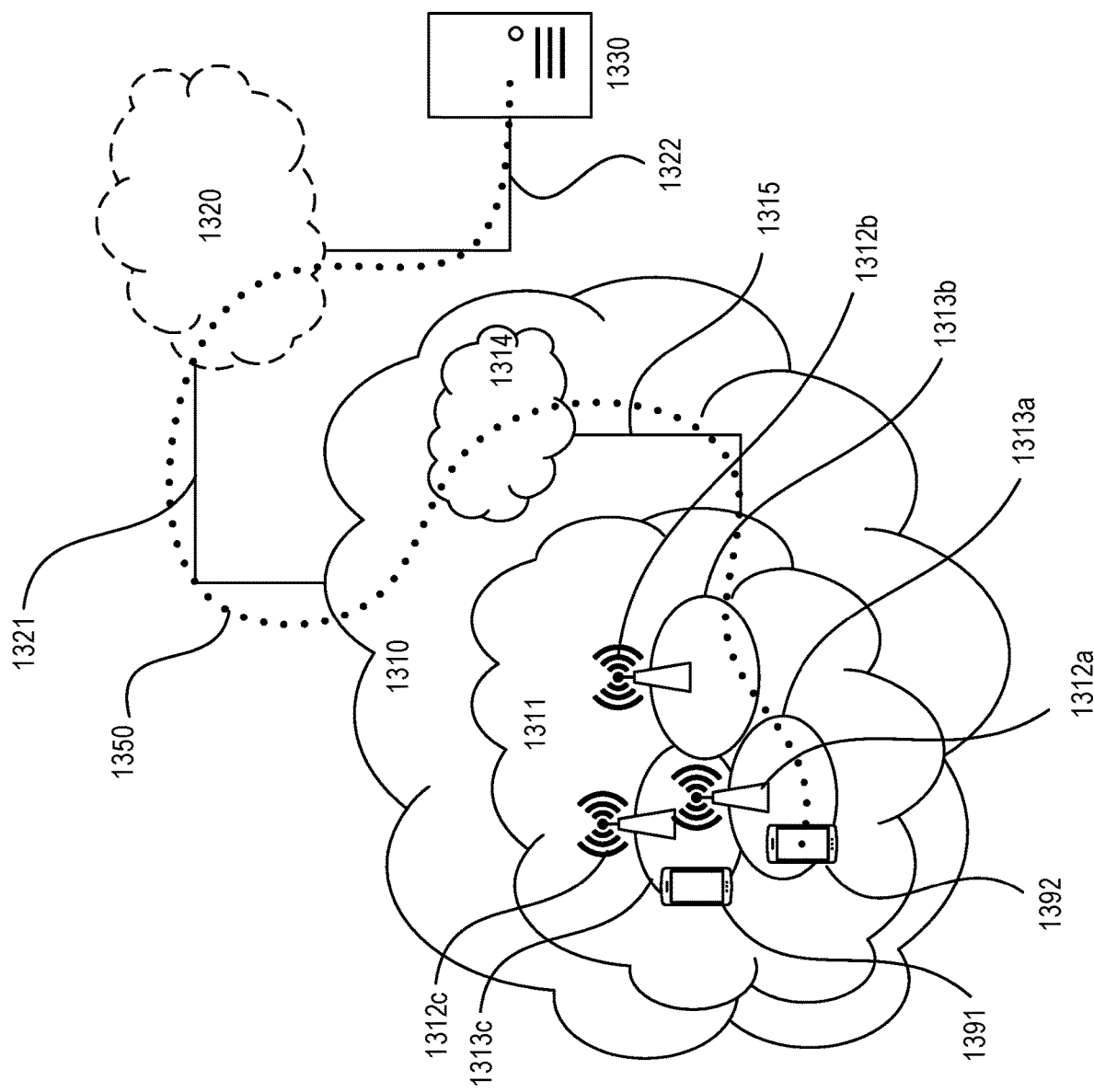
FIGS. 13-14 are block diagrams of various exemplary communication systems and/or networks, in accordance with various aspects described herein.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs, or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c can be configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the Telecommunication network 1310 is itself connected to host computer 1330, which can be embodied in the hardware and/or software of a standalone server, a cloud-implemented server, a distributed server or as processing resources in a server farm. Host computer 1330 can be under the ownership or control of a service provider, or can be operated by the service provider or on behalf of the service provider. Connections 1321 and 1322 between telecommunication network 1310 and host computer 1330 can extend directly from core network 1314 to host computer 1330 or can go via an optional intermediate network 1320. Intermediate network 1320 can be one of, or a combination of more than one of, a public, private or hosted network; intermediate network 1320, if any, can be a backbone network or the Internet; in particular, intermediate network 1320 can comprise two or more sub-networks (not shown).

The communication system of FIG. 13 as a whole enables connectivity between the connected UEs 1391, 1392 and host computer 1330. The connectivity can be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 can be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which can have storage and/or processing capabilities. In particular, processing circuitry 1418 can comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 can be operable to provide a service to a remote user, such as UE 1430 connecting via OTT connection 1450 terminating at UE 1430 and host computer 1410. In providing the service to the remote user, host application 1412 can provide user data which is transmitted using OTT connection 1450.

Communication system 1400 can also include base station 1420 provided in a telecommunication system and comprising hardware 1425 enabling it to communicate with host computer 1410 and with UE 1430. Hardware 1425 can include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 can be configured to facilitate connection 1460 to host computer 1410. Connection 1460 can be direct or it can pass through a core network (not shown in FIG. 14) of the telecommunication system and/or through one or more intermediate networks outside the telecommunication system. In the embodiment shown, hardware 1425 of base station 1420 can also include processing circuitry 1428, which can comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 can also include UE 1430 already referred to. Its hardware 1435 can include radio interface 1437 configured to set up and maintain wireless connection 1470 with a base station serving a coverage area in which UE 1430 is currently located. Hardware 1435 of UE 1430 can also include processing circuitry 1438, which can comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 can be operable to provide a service to a human or non-human user via UE 1430, with the support of host computer 1410. In host computer 1410, an executing host application 1412 can communicate with the executing client application 1432 via OTT connection 1450 terminating at UE 1430 and host computer 1410. In providing the service to the user, client application 1432 can receive request data from host application 1412 and provide user data in response to the request data. OTT connection 1450 can transfer both the request data and the user data. Client application 1432 can interact with the user to generate the user data that it provides.

Figure 14:
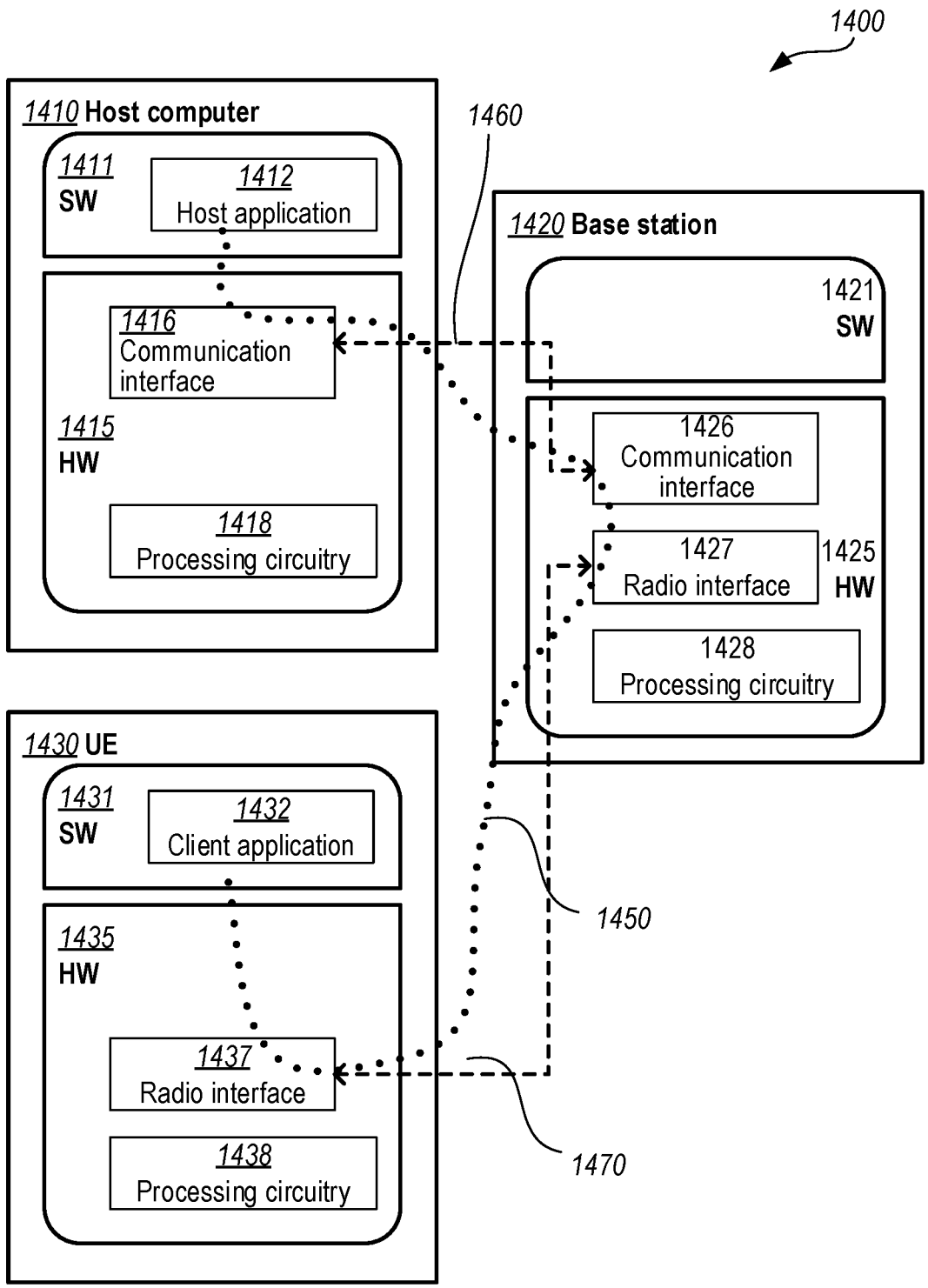

It is noted that host computer 1410, base station 1420 and UE 1430 illustrated in FIG. 14 can be similar or identical to host computer 1330, one of base stations 1312a, 1312b, 1312c and one of UEs 1391, 1392 of FIG. 13, respectively. This is to say, the inner workings of these entities can be as shown in FIG. 14 and independently, the surrounding network topology can be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure can determine the routing, which it can be configured to hide from UE 1430 or from the service provider operating host computer 1410, or both. While OTT connection 1450 is active, the network infrastructure can further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the exemplary embodiments disclosed herein can improve flexibility for the network to monitor end-to-end quality-of-service (QoS) of data flows, including their corresponding radio bearers, associated with data sessions between a UE and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1450 between host computer 1410 and UE 1430, in response to variations in the measurement results. The measurement procedure and/or the network functionality for reconfiguring OTT connection 1450 can be implemented in software 1411 and hardware 1415 of host computer 1410 or in software 1431 and hardware 1435 of UE 1430, or both. In embodiments, sensors (not shown) can be deployed in or in association with communication devices through which OTT connection 1450 passes; the sensors can participate in the measurement procedure by supplying values of the monitored quantities exemplified above, or supplying values of other physical quantities from which software 1411, 1431 can compute or estimate the monitored quantities. The reconfiguring of OTT connection 1450 can include message format, retransmission settings, preferred routing etc.; the reconfiguring need not affect base station 1420, and it can be unknown or imperceptible to base station 1420. Such procedures and functionalities can be known and practiced in the art. In certain embodiments, measurements can involve proprietary UE signaling facilitating host computer 1410's measurements of throughput, propagation times, latency and the like. The measurements can be implemented in that software 1411 and 1431 causes messages to be transmitted, in particular empty or 'dummy' messages, using OTT connection 1450 while it monitors propagation times, errors etc.

FIG. 15 is a flowchart illustrating an exemplary method and/or procedure implemented in a communication system, in accordance with one embodiment. The communication system includes a host computer, a base station and a UE which, in some exemplary embodiments, can be those described with reference to FIGS. 13 and 14. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

FIG. 17 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as Read Only Memory (ROM), RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties. Example embodiments of the techniques and apparatus described herein include, but are not limited to, the following enumerated examples:

1. A method, in a CN, for negotiation of policies for BDT between an AF and the CN, the method comprising:
 negotiating (810) one or more first BDT policies with the AF;
 determining (820) that at least one of the first BDT policies will be affected by network performance;
 determining (830) updated BDT policy information for each affected first BDT policy, wherein the updated BDT policy information for an affected first BDT policy includes at least one of the following:
  one or more candidate second BDT policies, and
  one or more updated conditions for the affected first BDT policy.

2. The method of embodiment 1, further comprising:
 sending (840), to the AF, the updated BDT policy information for each affected first BDT policy; and
 receiving (850), from the AF, one or more second BDT policies, wherein each second BDT policy is one of the candidate second BDT policies associated with an affected first BDT policy.

3. The method of any of embodiments 1-2, further comprising, for each affected first BDT policy having one or more updated conditions, sending (880), to a data repository associated with the CN, the one or more updated conditions in association with an identifier of the affected first BDT policy.

4. The method of any of embodiments 1-3, wherein:
 the one or more updated conditions include an updated BDT time window; and
 the method further comprises:
 identifying (860) one or more UE, associated with the CN, to which the affected first BDT policies have been applied; and
 based on the updated BDT time window, updating (870) route-selection policy rules for the identified UEs.

5. The method of any of embodiments 1-4, wherein the one or more updated conditions include at least one of the following: an updated charging rate and an updated maximum aggregated bitrate.

6. The method of any of embodiments 1-5, wherein:
the CN is a 5GC;
the method is performed by a PCF of the 5GC; and
the PCF communicates with the AF via a NEF of the 5GC.

7. A method, in an AF, for negotiation of policies BDT between the AF and a CN, the method comprising:
negotiating (910) one or more first BDT policies with the CN; and
receiving (920), from the CN, updated BDT policy information for at least one of the first BDT policies that will be affected by network performance, wherein the updated BDT policy information for an affected first BDT policy includes at least one of the following:
one or more candidate second BDT policies, and
one or more updated conditions for the affected first BDT policy.

8. The method of embodiment 7, further comprising: for each affected first BDT policy for which the updated BDT policy information includes candidate second BDT policies, selecting (930) a second BDT policy from among the one or more candidate second BDT policies; and
sending (940), to the CN, the selected second BDT policies.

9. The method of any of embodiments 7-8, wherein the one or more updated conditions include any of the following: an updated BDT time window, an updated charging rate, and an updated maximum aggregated bitrate.

10. The method of any of embodiments 7-9, wherein:
the CN is a 5GC; and
the AF communicates with a PCF of the 5GC via a NEF of the 5GC.

11. A CN (298, 398) configured to negotiate policies for BDT between an AF (1220) and the CN, the CN comprising:
one or more network nodes (1060, 1230) configured to provide a PCF (350) operable to negotiate the BDT policies with the AF,
wherein the one or more network nodes include processing circuitry (1070, 1260) configured to perform operations corresponding to any of the methods of embodiments 1-6.

12. The CN of claim 11, wherein the one or more nodes (1060, 1230) are further configured to provide a network exposure function, NEF (360) by which the PCF (350) communicates with the AF (1220).

13. A core network, CN (298, 398) configured to negotiate policies for BDT between an application function, AF (1220) and the CN, the CN being arranged to perform operations corresponding to any of the methods of embodiments 1-6.

14. A non-transitory, computer-readable medium (1080, 1290) storing computer-executable instructions (1295) that, when executed by processing circuitry (1070, 1260) associated with a core network, CN, configure the CN to perform operations corresponding to any of the methods of embodiments 1-6.

15. A computer program product comprising computer-executable instructions (1295) that, when executed by processing circuitry (1070, 1260) associated with a core network, CN, configure the CN to perform operations corresponding to any of the methods of embodiments 1-6.

16. An application function, AF (1220) configured to negotiate policies for BDT between the AF and a core network, CN (298, 398), the AF comprising:
interface circuitry (1270) configured to communicate with a policy control function, PCF (350) of the CN; and
processing circuitry (1260) operably coupled to the interface circuitry, whereby the processing circuitry and interface circuitry are configured to perform operations corresponding to any of the methods of embodiments 7-10.

17. An application function, AF (1220) configured to negotiate policies for BDT between the AF and a core network, CN (298, 398), the AF being arranged to perform operations corresponding to any of the methods of embodiments 7-10.

18. A non-transitory, computer-readable medium (1290) storing computer-executable instructions (1295) that, when executed by processing circuitry (1260) associated with an application function, AF (1220), configure the AF to perform operations corresponding to any of the methods of embodiments 7-10.

19. A computer program product comprising computer-executable instructions (1295) that, when executed by processing circuitry (1260) associated with an application function, AF (1220), configure the AF to perform operations corresponding to any of the methods of embodiments 7-10.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of updating a background data transfer (BDT) policy negotiated between an application function (AF) and a core network (CN) of a telecommunication network, the method being performed by a Policy Control Function (PCF) of the CN and comprising:
in response to receiving a notification of degraded network performance of a network area, determining that the negotiated BDT policy is affected by the degraded network performance and an Application Service Provider (ASP) associated with the negotiated BDT policy requested a warning notification;
determining, at least based on operator policies, updated BDT policy information for the negotiated BDT policy, wherein the updated BDT policy information comprises at least one of the following:
at least one candidate BDT policy, and
updated conditions for the negotiated BDT policy, and
sending the updated BDT policy information to the AF.

2. The method according to claim 1, the step of sending comprising:
sending the updated BDT policy information to the AF as a notification via a Network Exposure Function, NEF.

3. The method according to claim 1, further comprising the step of:
updating the negotiated BDT policy stored in a data repository based on the updated conditions for the negotiated BDT policy.

4. The method according to claim 1, wherein:
the updated conditions comprise an updated BDT time window; and
the method further comprises:
identifying one or more user equipment (UEs) to which the negotiated BDT policy has been applied; and
updating route-selection policy rules for the one or more UEs based on the updated BDT time window.

5. The method according to claim 1, further comprising:
receiving, from the AF, a further BDT policy selected by the AF from the at least one candidate BDT policy, and updating the negotiated BDT policy to the selected further BDT policy.

6. The method according to claim 1, wherein the updated conditions comprise at least one of the following: an updated charging rate and an updated maximum aggregated bitrate.

7. A non-transitory, computer-readable storage medium storing program instructions that, when executed on at least one processor, cause a Policy Control Function (PCF) of a core network (CN) of a telecommunication network to perform operations corresponding to the method according to claim 1.

8. A method of updating a background data transfer (BDT) policy negotiated between an application function (AF) and a Core Network (CN) of a telecommunication network, the method performed by the AF and comprising:
receiving, from a Policy Control Function (PCF) in the CN, updated BDT policy information, wherein:
the updated BDT policy information is based on the following:
a current BDT policy between the AF and the CN being affected by degraded network performance, and
a request by an Application Service Provider (ASP) associated with the current policy for a warning notification; and
the updated BDT policy information comprises at least one of the following:
at least one candidate BDT policy, and
updated conditions for the negotiated BDT policy.

9. The method according to claim 8, further comprising:
selecting a further BDT policy from the at least one candidate BDT policy, and
sending the selected further BDT policy to the PCF.

10. A non-transitory, computer-readable storage medium storing program instructions that, when executed on at least one processor, cause an application function (AF) associated with a telecommunication network to perform operations corresponding to the method according to claim 9.

11. The method according to claim 8, wherein the updated conditions comprise any of the following: an updated BDT time window, an updated charging rate, and an updated maximum aggregated bitrate.

12. A Policy control Function (PCF) in a core network (CN) of a telecommunication network, the PCF arranged for updating a background data transfer (BDT) policy negotiated between an application function (AF) and the CN, the PCF comprising processing circuitry and communication interface circuitry configured to:
in response to receiving a notification of degraded network performance of a network area, determine that the negotiated BDT policy is affected by the degraded network performance and an Application Service Provider (ASP) associated with the negotiated BDT policy requested a warning notification;
determine, at least based on operator policies, updated BDT policy information for the negotiated BDT policy, wherein the updated BDT policy information comprises at least one of the following:
at least one candidate BDT policy, and
updated conditions for the negotiated BDT policy, and
send the updated BDT policy information to the AF.

13. The PCF according to claim 12, wherein the processing circuitry and communication interface circuitry are further configured to update the negotiated BDT policy stored in a data repository based on the updated conditions for the negotiated BDT policy.

14. The PCF according to claim 13, wherein:
the updated conditions comprise an updated BDT time window; and
the processing circuitry and the communication interface circuitry are further configured to:
identify one or more user equipment (UEs) to which the negotiated BDT policy has been applied; and
update route-selection policy rules for the one or more UEs based on the updated BDT time window.

15. The PCF according to claim 13, wherein the processing circuitry and the communication interface circuitry are further configured to:
receive, from the AF, a further BDT policy selected by the AF from the at least one candidate BDT policy; and
update the negotiated BDT policy to the selected further BDT policy.

16. An Application Function (AF) configured to update a background data transfer (BDT) policy negotiated between the AF and a Core Network (CN) in a telecommunication network, the AF comprising processing circuitry and communication interface circuitry configured to:
receive, from a Policy Control Function (PCF) in the CN, updated BDT policy information, wherein:
the updated BDT policy information is based on the following:
a current BDT policy between the AF and the CN being affected by degraded network performance, and
a request by an Application Service Provider (ASP) associated with the current policy for a warning notification; and
the updated BDT policy information comprises at least one of the following:
at least one candidate BDT policy, and
updated conditions for the negotiated BDT policy.

17. The Application Function according to claim 16, wherein the processing circuitry and the communication interface circuitry are further configured to:
select a further BDT policy from the at least one candidate BDT policy; and
send the selected further BDT policy to the PCF.

* * * * *

UNITED STATES PATENT AND TRADEMARK OFFICE
CERTIFICATE OF CORRECTION

PATENT NO. : 11,792,612 B2
APPLICATION NO. : 17/609962
DATED : October 17, 2023
INVENTOR(S) : Gonzalez et al.

It is certified that error appears in the above-identified patent and that said Letters Patent is hereby corrected as shown below:

On the Title Page

Item (72), under "Inventors", in Column 1, Line 5, delete "Alarcon" and insert -- Alarcón --, therefor.

Item (57), under "ABSTRACT", in Column 2, Line 3, delete "disclose." and insert -- disclosed. --, therefor.

In the Drawings

Figure 4:
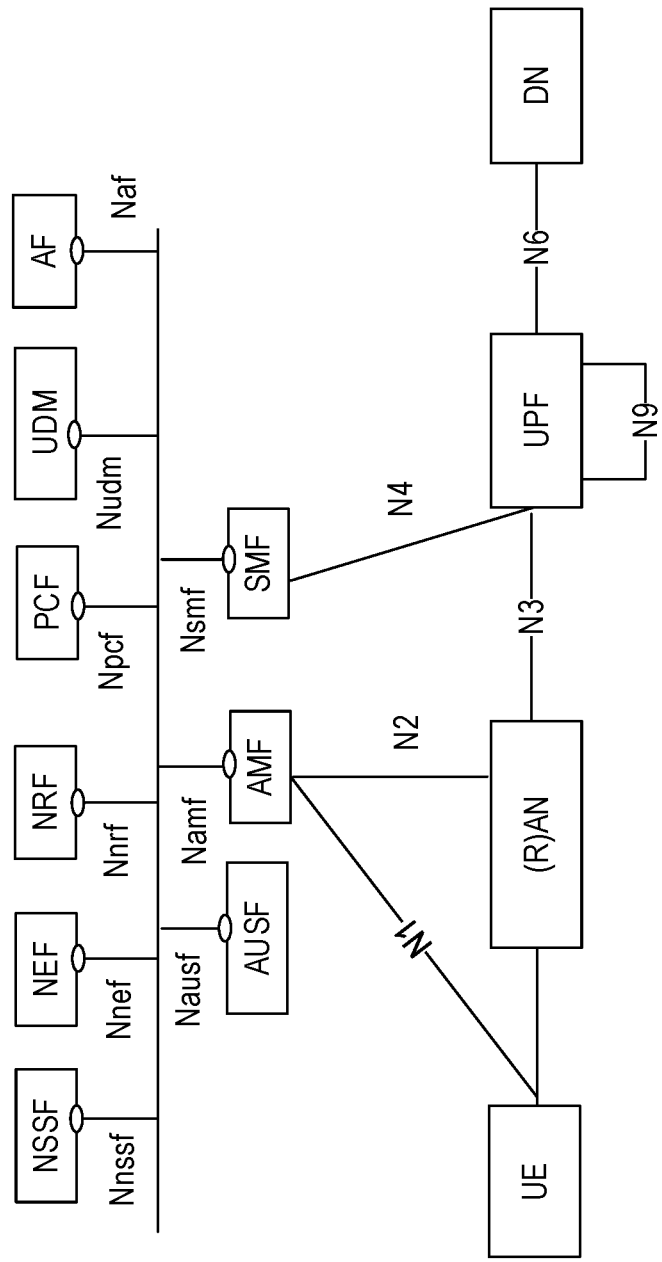
FIG. 4 shows an exemplary non-roaming 5G reference architectures with service-based interfaces and various network functions, NFs, as further described in 3GPP TS 23.501 (v16.1.0).

In Fig. 4, Sheet 3 of 14, delete "(R)AN" and insert -- RAN --, therefor.

In Fig. 10, Sheet 9 of 14, for Tag "1072", Line 1, delete "Tranceiver" and insert -- Transceiver --, therefor.

In Fig. 10, Sheet 9 of 14, for Tag "1074", Lines 1-2, delete "Base Band Circuitry" and insert -- Base Band Processing Circuitry --, therefor.

In Fig. 10, Sheet 9 of 14, for Tag "1024", Lines 1-2, delete "Base Band Circuitry" and insert -- Base Band Processing Circuitry --, therefor.

In the Specification

In Column 2, Line 43, delete "gNodeB's" and insert -- gNodeBs --, therefor.

In Column 2, Line 48, delete "the the" and insert -- the --, therefor.

In Column 3, Line 3, delete "such" and insert -- such as --, therefor.

In Column 3, Line 48, delete "Another change" and insert the same on Line 49, before "in 5G networks", as a new paragraph.

Signed and Sealed this
Twenty-third Day of January, 2024

Katherine Kelly Vidal
*Director of the United States Patent and Trademark Office*

CERTIFICATE OF CORRECTION (continued)
U.S. Pat. No. 11,792,612 B2

In Column 6, Line 24, delete "generated" and insert -- generate --, therefor.

In Column 6, Line 35, delete "NMO" and insert -- MNO --, therefor.

In Column 7, Line 10, delete "to be" and insert -- is --, therefor.

In Column 7, Line 26, delete "This" and insert -- These --, therefor.

In Column 7, Line 42, delete "of" and insert -- of: --, therefor.

In Column 8, Line 15, delete "select" and insert -- to select --, therefor.

In Column 8, Line 18, delete "negotiation" and insert -- negotiation. --, therefor.

In Column 8, Line 37, delete "with the a" and insert -- the --, therefor.

In Column 11, Line 22, delete "communicate" and insert -- communicating --, therefor.

In Column 12, Line 63, delete "previously-negotiated" and insert -- previously negotiated --, therefor.

In Column 15, Line 2, delete "id," and insert -- ID, --, therefor.

In Column 16, Line 8, delete "polices" and insert -- policies --, therefor.

In Column 16, Line 55, delete "CN)" and insert -- CN --, therefor.

In Column 16, Line 65, delete "herein" and insert -- herein. --, therefor.

In Column 17, Line 2, delete "polices" and insert -- policies --, therefor.

In Column 17, Line 57, delete "with the" and insert -- the --, therefor.

In Column 18, Line 1, delete "polices" and insert -- policies --, therefor.

In Column 18, Line 31, delete "with the a" and insert -- the --, therefor.

In Column 20, Line 7, delete "NodeB's" and insert -- NodeBs --, therefor.

In Column 20, Line 48, delete "SOC." and insert -- SoC. --, therefor.

In Column 20, Line 57, delete "units" and insert -- units. --, therefor.

In Column 23, Line 11, delete "mobile-type" and insert -- machine-type --, therefor.

In Column 24, Line 6, delete "1012;" and insert -- 1012, --, therefor.

CERTIFICATE OF CORRECTION (continued)
U.S. Pat. No. 11,792,612 B2

In Column 24, Line 43, delete "SOC." and insert -- SoC. --, therefor.

In Column 26, Line 54, delete "interchangeable." and insert -- interchangeably. --, therefor.

In Column 28, Line 26, delete "high-density" and insert -- high-definition --, therefor.

In Column 28, Line 33, delete "(SIM/RUIM) module," and insert -- module (SIM/RUIM), --, therefor.

In Column 33, Lines 20-22, delete "which it can be configured to hide from UE 1430 or from the service provider operating host computer 1410, or both." and insert -- which can be configured to hide from UE 1430 or from the service provider operating host computer 1410, or both, these devices. --, therefor.

In Column 35, Line 56, delete "according one" and insert -- according to one --, therefor.

In the Claims

In Column 39, Line 47, in Claim 12, delete "control" and insert -- Control --, therefor.